United States Patent
Sun

(10) Patent No.: US 12,523,724 B2
(45) Date of Patent: Jan. 13, 2026

(54) SYSTEMS AND METHODS FOR DETERMINING EQUILIBRIUM CEST EFFECT FOR MULTI-SLICE CEST IMAGING USING QUASI-STEADY STATE (QUASS) ANALYSIS

(71) Applicant: Emory University, Atlanta, GA (US)

(72) Inventor: Phillip Zhe Sun, Atlanta, GA (US)

(73) Assignee: Emory University, Atlanta, GA (US)

( * ) Notice: Subject to any disclaimer, the term of this patent is extended or adjusted under 35 U.S.C. 154(b) by 75 days.

(21) Appl. No.: 18/379,387

(22) Filed: Oct. 12, 2023

(65) Prior Publication Data

US 2024/0133986 A1    Apr. 25, 2024

Related U.S. Application Data

(60) Provisional application No. 63/415,339, filed on Oct. 12, 2022, provisional application No. 63/415,331, filed on Oct. 12, 2022.

(51) Int. Cl.
    *G01R 33/485*      (2006.01)
    *G01R 33/44*      (2006.01)

(52) U.S. Cl.
    CPC ......... *G01R 33/485* (2013.01); *G01R 33/448* (2013.01)

(58) Field of Classification Search
    CPC .......................... G01R 33/448; G01R 33/485
    See application file for complete search history.

(56) References Cited

U.S. PATENT DOCUMENTS

| | | | | |
|---|---|---|---|---|
| 8,278,925 B2 * | 10/2012 | Sun | ..................... | G01R 33/4828 324/309 |
| 10,048,340 B2 | 8/2018 | Sun et al. | | |
| 10,247,799 B2 * | 4/2019 | Sun | ..................... | G01R 33/5605 |
| 10,267,881 B2 | 4/2019 | Song et al. | | |
| 11,428,768 B2 * | 8/2022 | Sun | ..................... | G01R 33/4835 |

(Continued)

OTHER PUBLICATIONS

Kim et al. "Demonstration of fast multi-slice quasi-steady-state chemical exchange saturation transfer (QUASS CEST) human brain imaging at 3T." Magnetic Resonance in Medicine. 2022; 87(2):810-819.

(Continued)

*Primary Examiner* — Gregory H Curran
(74) *Attorney, Agent, or Firm* — Emory Patent Group

(57) ABSTRACT

The devices, systems, and methods can overcome the impact of scan protocols on experimental measurements to reconstruct the CEST equilibrium effect and can therefore improve the quantification of the underlying CEST contrast mechanism. The methods may include determining a spinlock relaxation rate for each RF offset for at least the first signal average so that the normalized spectrum for each RF offset and each slice first signal average corresponds to at least each transient state associated with each saturated slice readout normalized by at least each control state associated with each control slice readout based on the spinlock relaxation rate. The method may further include reconstructing CEST equilibrium effect for each RF offset using the respective spinlock relaxation rate for the RF offset. The method may include determining one or more quantitative information using the CEST equilibrium effect.

16 Claims, 23 Drawing Sheets

(56) References Cited

U.S. PATENT DOCUMENTS

2023/0152403 A1    5/2023    Zu

OTHER PUBLICATIONS

Sun et al. "Fast multislice pH-weighted chemical exchange saturation transfer (CEST) MRI with Unevenly segmented RF irradiation." Magnetic Resonance in Medicine. 2011; 65(2):588-94.

Sun, PZ. "Quasi-steady state chemical exchange saturation transfer (QUASS CEST) analysis—correction of the finite relaxation delay and saturation time for robust CEST measurement." Magnetic Resonance in Medicine. 2021; 85:3281-3289.

Sun, PZ. "Quasi-steady-state Cest (QUASS CEST) solution improves the accuracy of CEST quantification: QUASS CEST MRI-based omega plot analysis." Magnetic Resonance in Medicine. 2021; 86:765-776.

Sun PZ. "Quasi-steady-state amide proton transfer (QUASS APT) MRI enhances pH-weighted imaging of acute stroke." Magnetic Resonance in Medicine. 2022; 88:2633-2644.

Sun PZ. "Generalization of quasi-steady-state reconstruction to CEST MRI with two-tiered RF saturation and gradient-echo readout—Synergistic nuclear Overhauser enhancement contribution to brain tumor amide proton transfer-weighted MRI." Magnetic Resonance in Medicine. 2023; 89:2014-2023.

Wu et al. "Investigating the origin of pH-sensitive magnetization transfer ratio asymmetry MRI contrast during the acute stroke: Correction of T1 change reveals the dominant amide proton transfer MRI signal." Magnetic Resonance in Medicine. 2020; 84:2702-2712.

Wu et al. "Fast and equilibrium CEST imaging of brain tumor patients at 3T." Neuroimage: Clinical. 2022; 33:102890.

* cited by examiner

| | Contralateral Normal Area | | Ischemic Lesion | | Difference (Ischemic − Normal ROIs) | |
|---|---|---|---|---|---|---|
| | Apparent | QUASS | Apparent | QUASS | Apparent | QUASS |
| $MTR_{asym}$ @3.5 ppm (%) | -3.46±0.62#* | -3.67±0.66#* | -5.53±0.68#* | -5.94±0.73#* | -2.07±0.52* | -2.27±0.57* |
| $MTR_{asym}$ @2 ppm (%) | -0.32±0.60 | -0.33±0.61 | -0.85±0.37 | -0.87±0.39 | -0.53±0.53 | -0.55±0.54 |
| $R_{ex}$ @ 3.5 ppm (1/s) | 0.19±0.02#* | 0.25±0.02#* | 0.16±0.02#* | 0.22±0.03#* | -0.03±0.01 | -0.03±0.01 |
| $R_{ex}$ @ -3.5 ppm (1/s) | 0.23±0.03* | 0.30±0.02* | 0.22±0.03* | 0.30±0.03* | -0.01±0.01* | -0.00±0.01* |
| $R_{ex}$ @ 2 ppm (1/s) | 0.20±0.03#* | 0.28±0.04* | 0.18±0.04#* | 0.27±0.04* | -0.02±0.01* | -0.01±0.01* |
| $R_{ex}$ @ -2 ppm (1/s) | 0.21±0.03* | 0.28±0.03* | 0.18±0.04* | 0.28±0.04* | -0.01±0.01* | -0.00±0.01* |

| Amplitude of isolated CEST effects (multi-pool Lorentzian fitting) | Contralateral Normal Area | | Ischemic Lesion | | Difference (Ischemic – Normal ROIs) | |
|---|---|---|---|---|---|---|
| | Apparent | QUASS | Apparent | QUASS | Apparent | QUASS |
| MT (%/s) | 20.83±2.41#* | 27.86±2.57#* | 18.34±2.75#* | 26.12±2.97 #* | -2.49±0.70* | -1.73±0.86* |
| Amide @ 3.5 ppm (%/s) | 2.14±0.29#* | 2.61±0.34#* | 1.45±0.20#* | 1.78±0.21#* | -0.69±0.25* | -0.83±0.30* |
| Amine @ 3 ppm (%/s) | 2.61±0.47#* | 2.78±0.59#* | 1.56±0.37#* | 1.39±0.55#* | -1.05±0.41* | -1.39±0.48* |
| Guanidyl @ 2 ppm (%/s) | 1.84±0.28#* | 2.09±0.38#* | 2.80±0.39#* | 3.28±0.44#* | 0.96±0.26* | 1.19±0.25* |
| NOE @ -1.6 ppm (%/s) | 0.68±0.50 | 0.58±0.45 | 0.58±0.34* | 0.28±0.21* | -0.09±0.38* | -0.30±0.40* |
| NOE @ -2.75 ppm (%/s) | 0.91±0.36 | 1.19±0.57 | 1.26±0.43 | 1.21±0.46 | 0.36±0.52 | 0.02±0.90 |
| NOE @ -3.5 ppm (%/s) | 5.18±0.29* | 5.44±0.27* | 5.16±0.47* | 5.64±0.58* | -0.02±0.23 | -0.20±0.45 |

FIG. 8

FIG. 15A 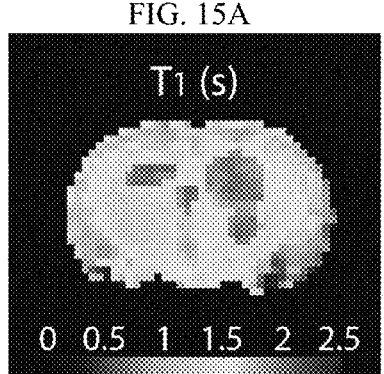 FIG. 15B 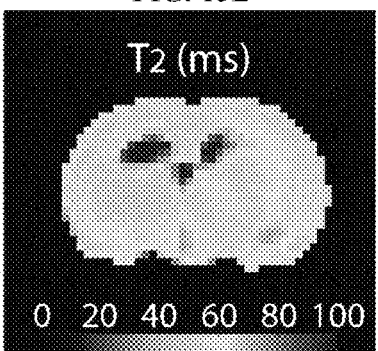 FIG. 15C 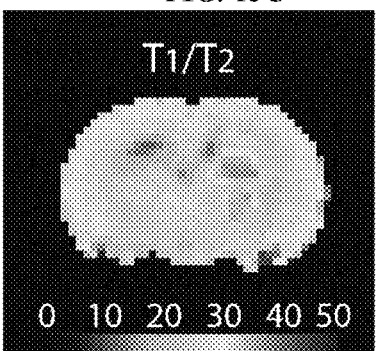
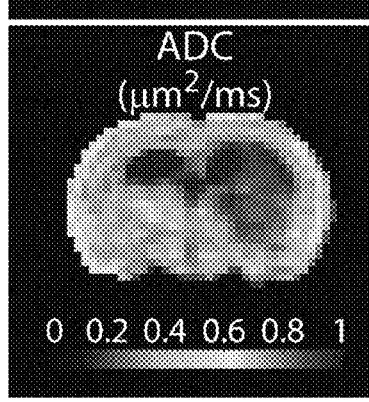 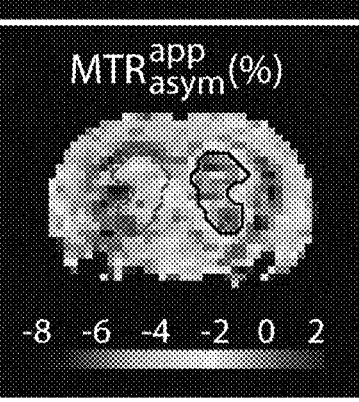 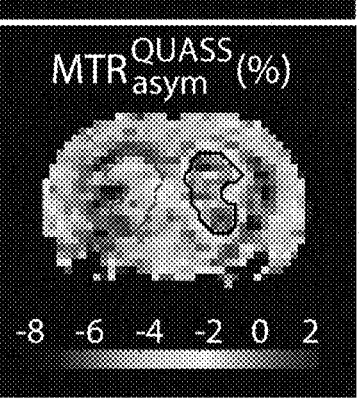
FIG. 15D  FIG. 15E  FIG. 15F

| Amplitude of isolated CEST effects (multi-pool spinlock fitting) | Contralateral Normal Tissue | | Tumor | | Difference (Tumor – Normal) | |
|---|---|---|---|---|---|---|
| | Apparent | QUASS | Apparent | QUASS | Apparent | QUASS |
| MTR$_{asym}$ @3.5 ppm (%) | -3.8 ± 0.8 #* | -4.0±0.8 #* | -0.9 ± 0.6 #* | -0.9 ± 0.7 #* | 3.0 ± 0.6 * | 3.1 ± 0.6 * |
| MT (%/s) | 20.6 ± 2.2 #* | 25.0 ± 2.1 #* | 13.2 ± 2.0 #* | 17.3 ± 2.2 #* | -7.5 ± 3.0 | -7.6 ± 3.1 |
| Amide @ 3.5 ppm (%/s) | 3.2 ± 0.4 #* | 3.6 ± 0.5 #* | 4.4 ± 0.5 #* | 5.1 ± 0.6 #* | 1.2 ± 0.5 * | 1.5 ± 0.6 * |
| Amine @ 3 ppm (%/s) | 4.7 ± 1.0 | 4.9 ± 0.9 | 4.6 ± 0.9 * | 4.9 ± 0.9 * | -0.2 ± 0.9 | 0.0 ± 1.0 |
| Guanidyl @ 2 ppm (%/s) | 1.5 ± 0.9 # | 1.9 ± 0.8 # | 0.7 ± 0.8 # | 0.9 ± 0.8 # | -0.8 ± 0.6 | -0.9 ± 0.8 |
| NOE-I @ -1.6 ppm (%/s) | 0.5 ± 0.3 | 0.5 ± 0.3 | 0.4 ± 0.3 | 0.4 ± 0.3 | -0.2 ± 0.4 | -0.2 ± 0.5 |
| NOE-II @ -2.75 ppm (%/s) | 0.5 ± 0.5 | 0.5 ± 0.4 | 0.9 ± 0.4 | 0.9 ± 0.4 | 0.4 ± 0.6 | 0.4 ± 0.5 |
| NOE-III @ -3.5 ppm (%/s) | 9.4 ± 1.5 #* | 10.2 ± 1.6 #* | 6.1 ± 0.8 #* | 6.8 ± 1.0 #* | -3.3 ± 1.0 | -3.4 ± 1.0 |

FIG. 20

SYSTEMS AND METHODS FOR DETERMINING EQUILIBRIUM CEST EFFECT FOR MULTI-SLICE CEST IMAGING USING QUASI-STEADY STATE (QUASS) ANALYSIS

CROSS-REFERENCE TO RELATED APPLICATIONS

This application claims the benefit of U.S. Provisional Application No. 63/415,331 filed on Oct. 12, 2022, and U.S. Provisional Application No. 63/415,339 filed on Oct. 12, 2022. The entirety of each of these applications is hereby incorporated by reference for all purposes.

STATEMENT REGARDING FEDERALLY SPONSORED RESEARCH OR DEVELOPMENT

This invention was made with government support under NS083654 awarded by the National Institutes of Health. The government has certain rights in the invention.

BACKGROUND

Amide proton transfer (APT)-weighted magnetic resonance imaging (MRI) is a metabolic MRI technique based on chemical exchange saturation transfer (CEST) that can allow for highly sensitive and specific detection of pathological processes on a molecular level, such as detection of tissue acidification after acute stroke, tumor detection and subtyping, among others. However, APT-weighted MRI can have a complex dependence on scan parameters and tissue properties. Despite its increasing adoption, its contrast mechanism has not yet been fully established.

SUMMARY

Thus, there is a need for accurate and efficient techniques that can quantify the underlying CEST contrast mechanism. The devices, systems, and methods of the disclosure can overcome the impact of scan protocols on experimental measurements to solve the underlying CEST signal change and can, therefore, improve the quantification of the underlying CEST contrast mechanism. The devices, systems, and methods are directed to a generalized quasi-steady-state (QUASS) solution that derives the equilibrium CEST effect from experimental measurements for a modified sequence that can include a long primary radiofrequency (RF) saturation followed by interleaved multi-slice readout.

In some embodiments, the methods may include a method for determining a chemical exchange saturation transfer (CEST) equilibrium effect. The method may include acquiring based on one or more parameters, radiofrequency (RF) offset, and the pulse sequence for one or more rounds: (i) two or more control slice readouts of magnetic resonance imaging (MRI) CEST imaging based on parameters and pulse sequence, ii) two or more saturated slice readouts of the MRI CEST imaging based on one or more parameters, RF offset, and the pulse sequence, iii) one or more signal averages for each slice readout and offset; and iv) normalized spectrum for each RF offset. The one or more signal averages may include a first signal average for each slice readout and offset. The one or more parameters may include relaxation delay. The two or more control slice readouts may include a first control slice readout and one or more additional control slice readouts. The two or more saturated slice readouts may include a first saturated slice readout and one or more additional saturated slice readouts.

In some examples, the method may further include determining a saturation time for each saturated slice readout for each signal average. In some examples, the method may also include determining a control relaxation time for each control slice readout using the respective saturation time and the relaxation delay for each signal average and determining a saturated relaxation time for each saturated slice readout using the relaxation delay for each signal average.

In some examples, the method may include determining a spinlock relaxation rate for each RF offset for at least the first signal average, using the one or more parameters, each saturated time for each saturated slice readout, each control relaxation time for each control slice readout, and each saturated relaxation time for each saturated slice readout for the first signal average, so that the normalized spectrum for each RF offset and each slice first signal average corresponds to at least each transient state associated with each saturated slice readout normalized by at least each control state associated with each control slice readout based on the spinlock relaxation rate.

In some examples, the method may include reconstructing CEST equilibrium effect for each RF offset using the respective spinlock relaxation rate for the RF offset. The method may further include determining one or more quantitative information using the CEST equilibrium effect.

In some embodiments, the systems may include a system for determining a chemical exchange saturation transfer (CEST) equilibrium effect. The system may include at least one computing device comprising a processor and a memory. The system may also include machine-readable instructions stored in the memory that, when executed by the processor can cause the computing device to at least acquire based on one or more parameters, radiofrequency (RF) offset, and the pulse sequence for one or more rounds: (i) two or more control slice readouts of magnetic resonance imaging (MRI) CEST imaging based on parameters and pulse sequence, ii) two or more saturated slice readouts of the MRI CEST imaging based on one or more parameters, RF offset, and the pulse sequence, iii) one or more signal averages for each slice readout and offset; and iv) normalized spectrum for each RF offset. The one or more signal averages may include a first signal average for each slice readout and offset. The one or more parameters may include relaxation delay. The two or more control slice readouts may include a first control slice readout and one or more additional control slice readouts. The two or more saturated slice readouts may include a first saturated slice readout and one or more additional saturated slice readouts.

In some examples, the machine-readable instructions, when executed, may further cause the at least one computing device to at least determine a saturation time for each saturated slice readout for each signal average. In some examples, the machine-readable instructions, when executed, may further cause the at least one computing device to at least determine a control relaxation time for each control slice readout using the respective saturation time and the relaxation delay for each signal average and determine a saturated relaxation time for each saturated slice readout using the relaxation delay for each signal average.

In some examples, the machine-readable instructions, when executed, may further cause the at least one computing device to at least determine a spinlock relaxation rate for each RF offset for at least the first signal average, using the one or more parameters, each saturated time for each saturated slice readout, each control relaxation time for each control slice readout, and each saturated relaxation time for each saturated slice readout for the first signal average, so that the normalized spectrum for each RF offset and each slice first signal average corresponds to at least each transient state associated with each saturated slice readout normalized by at least each control state associated with each control slice readout based on the spinlock relaxation rate.

In some examples, the machine-readable instructions, when executed, may further cause the at least one computing device to at least reconstruct CEST equilibrium effect for each RF offset using the respective spinlock relaxation rate for the RF offset. The machine-readable instructions, when executed, may further cause the at least one computing device to at least determine one or more quantitative information using the CEST equilibrium effect.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, the emphasis being placed upon illustrating the principles of the disclosure.

FIG. 3A shows simulated Z-spectra for slices 1 to 5 that were represented in different shades of gray. They showed less attenuation than the reconstructed QUASS Z-spectra (dashed lines), which overlays nicely with the simulated Z-spectra assuming long Td and Ts. FIG. 3B shows corresponding asymmetry spectra, revealing slice-dependent magnitude in the CEST effect. Again, the reconstructed QUASS asymmetry spectra and equilibrium asymmetry spectra (long Td, Ts1, and Ts2) overlapped QUASS, quasi-steady-state; Td, delay time; Ts, saturation time.

FIG. 4A shows Z-spectra from the contralateral normal area and ischemic lesion. FIG. 4B shows simulated Z-spectra from $T_1$ and $T_2$ maps for the normal and ischemic ROIs. FIG. 4C shows $R_{ex}$ spectra from the normal area and ischemic lesion. FIG. 4D shows simulated $R_{ex}^{DWS}$ spectra from the normal and ischemic ROIs. FIG. 4E shows CEST/MT spectra (i.e., $R_{ex}-R_{ex}^{DWS}$) from the normal area and ischemic lesion. FIG. 4F shows the CEST/MT spectral difference between the normal and ischemic ROIs DWS, direct water saturation; MT, magnetization transfer; $R_{ex}$, exchange rate; ROI, region of interest.

FIG. 5A shows Z-spectra from the contralateral normal area and ischemic lesion. FIG. 5B shows CEST/MT QUASS spectra (i.e., $R_{ex}-R_{ex}^{DWS}$) from the normal area and ischemic lesion. FIG. 5C shows the CEST/MT QUASS spectral difference between the normal and ischemic ROIs.

FIG. 7A shows the apparent $MTR_{asym}$ (3.5 ppm) map. FIG. 7B shows the apparent CEST/MT exchange spectral at +3.5 ppm (i.e., APT). FIG. 7C shows the apparent CEST/MT exchange spectral at −3.5 ppm (i.e., NOE). FIG. 7D shows the QUASS $MTR_{asym}$ (3.5 ppm) map. FIG. 7E shows the QUASS CEST/MT exchange spectral at +3.5 ppm (i.e., APT). FIG. 7F shows the QUASS CEST/MT exchange spectral at −3.5 ppm (i.e., NOE) APT, amide proton transfer; $MTR_{asym}$, magnetization transfer asymmetry; NOE, nuclear Overhauser enhancement; ppm, parts per million.

FIG. 8 shows a table showing that Lorentzian fitting resolves the multi-pool signal changes following acute stroke.

FIG. 9A shows apparent Z-spectra from the contralateral normal and ipsilateral ischemic lesion. FIG. 9B shows isolated multi-pool apparent spectral peaks, with the normal area (solid lines) and ischemic lesion (dash-dotted lines). FIG. 9C shows the residual errors between the apparent Z-spectral measurement and fitting for the contralateral normal and ipsilateral ischemic lesion.

FIG. 10A shows QUASS Z-spectra from the contralateral normal and ipsilateral ischemic lesion. FIG. 10B shows isolated multi-pool QUASS spectral peaks, with the normal area (solid lines) and ischemic lesion (dash-dotted lines). FIG. 10C shows the residual errors between the reconstructed QUASS spectra and fitting for the contralateral normal and ipsilateral ischemic lesion.

FIG. 12A shows a parametric $T_1$ map. FIG. 12B shows a parametric $T_2$ map. FIG. 12B shows a parametric ADC map. The ischemic lesion and the contralateral normal areas were outlined in lines.

FIG. 13A shows the apparent and QUASS Z-spectra from the contralateral normal area.

FIG. 14A shows simulated Z-spectra for slices 1 to 5. The apparent Z spectra showed less attenuation than the reconstructed QUASS Z-spectra (dashed lines), which overlayed nicely with the simulated Z-spectra assuming long Td and Ts.

FIGS. 15A-F show multiparametric images from a representative tumor-bearing animal. FIG. 15A shows a parametric $T_1$ map. FIG. 15B shows a parametric $T_2$ map. FIG. 15C shows parametric $T_1$ over the $T_2$ map. FIG. 15D shows the ADC map. FIG. 15E shows the acquired $MTR_{asym}$ map with the manually outlined tumor region of interest (ROI) and the contralateral normal tissue. FIG. 15F shows the QUASS $MTR_{asym}$ map.

FIG. 16A shows the apparent Z-spectra from the contralateral normal and tumor region of interest. FIG. 16B shows isolated multi-pool apparent spectral peaks, with the normal area represented in solid lines and the tumor region in dash-dotted lines. FIG. 16C shows the residual errors between the apparent Z-spectral measurement and fitting for the contralateral normal and tumor.

FIG. 17A shows QUASS Z-spectra from the contralateral normal and tumor region of interest. FIG. 17B shows isolated multi-pool QUASS spectral peaks, with the normal area represented in solid lines and the tumor region in dash-dotted lines. FIG. 17C shows the residual errors between the reconstructed QUASS spectra and fitting for the contralateral normal and tumor.

FIG. 19A shows the apparent and QUASS Z-spectra from the contralateral normal tissue region of interest (ROI).

FIG. 20 shows a table showing that spinlock model-based fitting resolves the multi-pool CEST signal changes between the tumor and contralateral normal tissue. A paired t-test was performed to test tumor and normal tissue values from fittings of the apparent and QUASS CEST MRI (#P<0.05), as well as between the apparent and QUASS values (*P<0.05).

DESCRIPTION OF THE EMBODIMENTS

Figure 1:
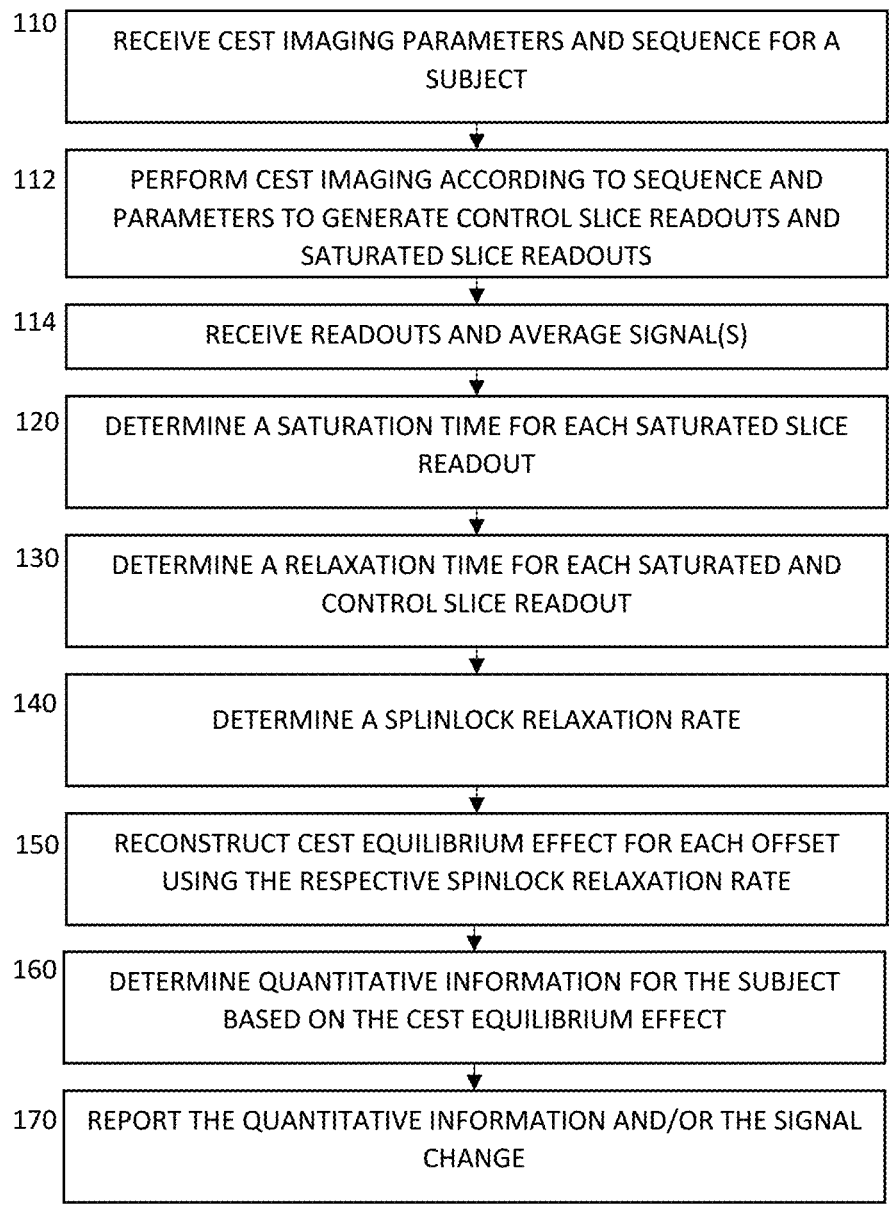
FIG. 1 shows a flow chart illustrating an example of a method of quantifying the CEST effect for multi-slice readouts using QUASS according to embodiments.

In the following description, numerous specific details are set forth, such as examples of specific components, devices, methods, etc., in order to provide a thorough understanding of the embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

The systems and methods of the disclosure can provide generalized quasi-steady-state (QUASS) solutions for modified multislice chemical exchange saturation transfer (CEST) magnetic resonance imaging (MRI) sequences, such as gradient echo, spin echo, etc. The systems and methods of the disclosure use a generalized QUASS solution to determine the equilibrium CEST effect to overcome the impact of scan protocol on experimental measures to solve the CEST signal changes. The systems and methods of the disclosure can, therefore, more accurately quantify the CEST contrast mechanism by determining the CEST equilibrium effect. The CEST equilibrium effect may be used to quantify labile proton concentration (e.g., metabolites and macromolecules), for example, as discussed in Examples 1 and 2, and microenvironmental properties, such as pH and temperature.

In some examples, the CEST equilibrium effect using the QUASS solutions according to the disclosure can enable high-field applications. For example, the RF saturation time could not be too long t at the high field because the RF energy deposition in tissue increases with the magnetic field strength. On the other hand, tissue T1 relaxation time increases with the field strength, which takes a longer saturation time to reach the same level of saturation time. QUASS provides a potential solution so the experimental saturation time can be modest, and the complete CEST effect can be reconstructed using the disclosed multi-slice QUASS analysis.

While some examples of the disclosure may be specific to processing images of the brain, it will be understood that these examples are nonlimiting and that the methods and systems may be performed for other parts of the body, including but not limited to the myocardium, muscle, prostate, and kidney. Additionally, while some examples of the disclosure may be specific to APT-weight (APTw) MRI and/or CEST imaging, it will be understood that these examples are also nonlimiting and that the methods and systems may also be applied to other types of MR imaging, including but not limited to CEST spectroscopy, magnetization transfer (MT), MR image(s), among others, or any combination thereof. Further, while some examples of the disclosure may be specific to determining signals related to stroke and tumor diagnosis, it will be understood that these examples are also nonlimiting and that the methods and systems may also be used to diagnose transient ischemia attack and epilepsy, etc. Additionally, while some examples of the disclosure may be specific to gradient echo and spin echo sequences, it will be understood that these examples are also nonlimiting, and the methods and systems may also be used with fast spin echo (FSE) and fast low angle shot magnetic resonance imaging (FLASH) sequences.

Various embodiments are described herein, including systems, methods, devices, modules, models, algorithms, networks, structures, processes, computer-program products, and the like.

FIG. 1 shows an example of a flow chart illustrating a method for determining the equilibrium CEST effect for a multi-slice sequence according to embodiments.

Operations in flow chart 100 may begin at block 110, the parameters for the CEST imaging and sequence may be received for a subject. The parameters may depend on the sequence. In some examples, the sequences may include but are not limited to a multi-slice spin echo sequence, a multi-slice gradient echo sequence, a multi-slice gradient and spin echo, a simultaneous multi-slice slice (SMS) readout, among others, or any combination thereof. In some examples, the multi-spin echo sequence and the multi-slice gradient echo sequence may correspond to the sequences provided in FIGS. 11 and 18.

In some examples, the include but are not limited to one or more radiofrequency (RF) offsets (Δω), relaxation delay (Td), RF amplitude ($B_1$), primary RF saturation time (Ts), secondary RF saturation time (Ts2), number of slices (N), number of repeated measurements, $$\theta\left(\operatorname{atan}\left(\frac{\gamma B_1}{\Delta\omega}\right)\right),$$

number of averages (also referred to as "number of signal averages") (NA), gyromagnetic ratio (γ), flip angle (α) (e.g., for gradient echo), bulk tissue water longitudinal rates ($R_{1w}$, sometimes written as $R_1$), transverse relaxation rates ($R_{2w}$ or $R_2$), among others, or any combination thereof. In some examples, the parameters may include one RF offset. In other examples, the parameters may include more than one RF offset. In some examples, one or more of the parameters may be selected by the clinician.

Next, at block 112, the CEST MR imaging according to the parameters and the sequence may be performed using an MR imaging system to acquire control slice readouts and saturated slice readouts based on the control scans and the saturated scans, respectively, for each round. In some examples, the MR imaging system may include any available system, for example, capable of acquiring MRS/MRSI data, CEST data with and/or without Z-spectrum, and field maps, among others.

In some examples, at block 114, the readouts and one or more signal averages may be received from the imaging system (e.g., MR scanner) and/or a database, according to embodiments. In some examples, each signal average may correspond to image readouts of the same slice and same RF offset. Each readout may correspond to at least one slice. In some examples, the number of signal averages received may correspond to the number of rounds of readouts. In some examples, the number of signal averages may include a subset of slices within a round (e.g., repeated scan), so there may be more than one signal average for a round. In some examples, the readouts may be a simultaneous multi-slice readout. In some examples, the preparation modules associated with the readout, readout time, among others, or any combination thereof may also be received from the imaging system. The preparation modules may include but are not limited to fat suppression, outer volume suppression, among others, or any combination thereof.

Next, at block 120, a saturation time for each saturated slice readout may be determined for each signal average, according to embodiments. For the first signal average, the (first) saturation time for each saturated slice may correspond to Ts1+(i−1)*Ts2, where i is the ith slice and Ts1 and Ts2 are the RF saturation times. For each additional signal average (e.g., the second signal average, third signal average, etc.), the (second) saturation time may correspond to N*Ts2.

Next, at block 130, a relaxation time for each saturated slice readout and each control slice readout may be determined using the saturation time, according to embodiments. In some examples, for the first signal average, the (first) relaxation time for each control slice readout may correspond to Td+Ts1+(i−1)*Ts2. For the one or more additional signal averages (e.g., the second signal average, the third signal average, etc.), the (second) relaxation time for each control slice readout may correspond to N*Ts2.

In some examples, for the first round, the (first) relaxation time for each saturated slice readout may correspond to Td. For each additional average signal, the (second) relaxation time for each saturated slice readout may also be based on the readout time, post RF saturation delay, and preparation modules (e.g., such as fat suppression and outer volume suppression, etc.).

Next, at block 140, a spinlock relaxation rate ($R_{1\rho}$) for each RF offset may be determined using the one or more parameters, the saturated time, each control relaxation time, and each saturated relaxation time. For example, if one signal average is received, the spinlock relaxation rate for each RF offset of the first signal average may be determined so that the normalized spectrum ($Z^{app}$) for each RF offset and each slice readout of the first signal average corresponds to at least each transient state associated with each saturated slice readout of the first signal average normalized by at least each control state associated with each control slice readout based on the spinlock relaxation rate for the first signal average.

In some examples, when there are two or more signal averages (e.g., a first signal average and one or more additional signal averages), determining the spinlock relaxation rate for each RF offset may be based on the first signal average and the one or more additional signal averages. For example, the spinlock relaxation rate for each offset may be determined using the parameters, the first saturated relaxation time for the first saturated slice readout, the second saturated relaxation time for each saturated readout of each additional signal average, the first control relaxation time for the first control slice readout, the second control relaxation time for each readout of each additional signal average, the first saturated time for the first saturated slice readout, the second saturated time for each saturated slice readout of each additional signal average, so that the normalized spectrum for each offset RF offset corresponds to the sum of at least a first transient state associated with the first signal average and a second transient state associated with the one or additional signal average(s) normalized by the sum of at least a first control state associated with the first signal average and a second transient state associated with the one or additional signal averages based on the spinlock relaxation rate.

In some examples, for multi-slice spin echo sequences, the transient state associated with each saturated slice readout of the first signal average may be represented as:

$$\left(1-e^{-R_{1w}\cdot Td}\right)e^{-R_{1\rho}\cdot[Ts1+Ts2*(i-1)]}+\frac{R_{1w}\cos^2\theta}{R_{1\rho}}\left(1-e^{-R_{1\rho}\cdot[Ts1+Ts2*(i-1)]}\right).$$

For the one or more additional averages, the transient state associated with each saturated slice readout of each additional average may be represented as:

$$\frac{R_{1w}\cos^2\theta}{R_{1\rho}}\left\{\Sigma_2^{NA}\left(1-e^{-R_{1\rho}\cdot[N\cdot Ts2]}\right)\right\}.$$

In this example, $$\frac{R_{1w}\cos^2\theta}{R_{1\rho}}$$

may correspond to the (CEST) equilibrium signal. In this example, $(1-e^{-R_{1w}\cdot Td})$ may correspond to a recovery transient signal, which can correspond to the signal remaining after the relaxation delay (Td).

In some examples, for multi-slice spin echo sequences, the control state associated with each control slice readout of the first signal average may be represented as:

$(1-e^{-R_{1w}\cdot[(Td+Ts1)+Ts2+(i-1)]})$. For the one or more additional signal averages, the control state associated with each control slice readout of each additional signal average may be represented as $\Sigma_2^{NA}(1-e^{-R_{1w}\cdot[N\cdot Ts2]})$. See also equation (1.3) below.

In some examples, for multi-slice gradient echo sequences, the transient state associated with ith slice of the number of slices (ns) readout of the first average (na=1) may be represented as:

$$I_{sat}^{app}(i, ns, na = 1) \approx \left\{ \begin{array}{c} (\cos\alpha \cdot e^{-R_{1w}\cdot Td} + 1 - e^{-R_{1w}\cdot Td})e^{-R_{1\rho}\cdot[Ts1+Ts2*(i-1)]} + \\ \dfrac{R_{1w}\cos^2\theta}{R_{1\rho}}(1 - e^{-R_{1\rho}\cdot[Ts1+Ts2*(i-1)]}) \end{array} \right\}.$$

$\sin\alpha$. For the one or more additional signal averages, the transient state associated with each saturated slice readout of each additional signal average may be represented as:

$$I_{sat}^{app}(i, ns, na > 1) \approx$$

$$\left\{ I_{sat}^{app}(i, ns, na-1) \cdot \dfrac{\cos\alpha}{\sin\alpha} \cdot e^{-R_{1\rho}\cdot[ns\cdot Ts2]} + \dfrac{R_{1w}\cos^2\theta}{R_{1\rho}}(1 - e^{-R_{1\rho}\cdot[ns\cdot Ts2]}) \right\} \cdot$$

$\sin\alpha$.

In some examples, for gradient echo sequences, the control state associated with each control slice readout of the first signal average may be represented as: $I_0^{app}(i, ns, na=1) \sim (\cos\alpha \cdot e^{-R_{1w}\cdot[(Td+Ts1)+Ts2+(i-1)]} + 1 - e^{-R_{1w}\cdot[(Td+Ts1)+Ts2+(i-1)]}) \cdot \sin\alpha$. For the one or more additional signal averages, the control state associated with each control slice readout of each additional signal average may be represented as $$I_0^{app}(i, ns, na > 1) \approx$$

$$\left\{ I_0^{app}(i, ns, na-1) \cdot \dfrac{\cos\alpha}{\sin\alpha} \cdot e^{-R_{1w}\cdot[ns\cdot Ts2]} + (1 - e^{-R_{1w}\cdot[ns\cdot Ts2]}) \right\} \cdot \sin\alpha.$$

See also equations 2.1, 2.2, 2.3, and 2.4 below.

In some examples, block 140 may be automatically repeated using different spinlock relaxation rates until the normalized spectrum ($Z^{app}$) for each RF offset corresponds to the transient criteria (e.g., transient state normalized by at least each control state) based on the inputted spinlock relaxation rate.

Next, at block 150, the equilibrium CEST effect ($Z^{QUASS}$) may be determined using the spinlock relaxation rate from block 140 ($R_{1\rho}^{QUASS}$). In some examples, the equilibrium QUASS CEST effect may be reconstructed using equations 1.4 and 2.6 below.

In some embodiments, at block 160, the method may include determining or generating quantitative information using the equilibrium CEST effect. The quantitative information may include but is not limited to one or more measurements; one or more quantitative images (of the region of interest based on the corrected and/or standardized data (e.g., image(s)/spectrum), the one or more measurements, among others, or a combination thereof; other information; or any combination thereof. In some embodiments, the one or more measurements may include soft-tissue measurements, morphological studies, chemical-shift measurements, magnetization-transfer measurements, measurements of one or more types of nuclear Overhauser effect measurements, and/or functional imaging. By way of specific examples, the one or more measurements may include tissue pH, temperature, creatine level, phosphocreatine level, glycogen level, glucose level, total amide proton level, among others, or any combination thereof. For example, the one or more measurements may include labile proton concentration (one or more measurements of metabolites and/or macromolecules) as discussed in Examples 1 and/or 2. In some examples, the quantitative information may be specific to a disease state (e.g., tissue ischemia in stroke, tumor grade, tumor Isocitrate Dehydrogenase (IDH) mutation status, etc.).

In some embodiments, at block 170, the method may include generating a report using the quantitative information, images, among others, or any combination thereof. In some examples, the report may be transmitted for display and/or storage to a healthcare information system, to a user interface, among others, or any combination thereof.

Figure 2:
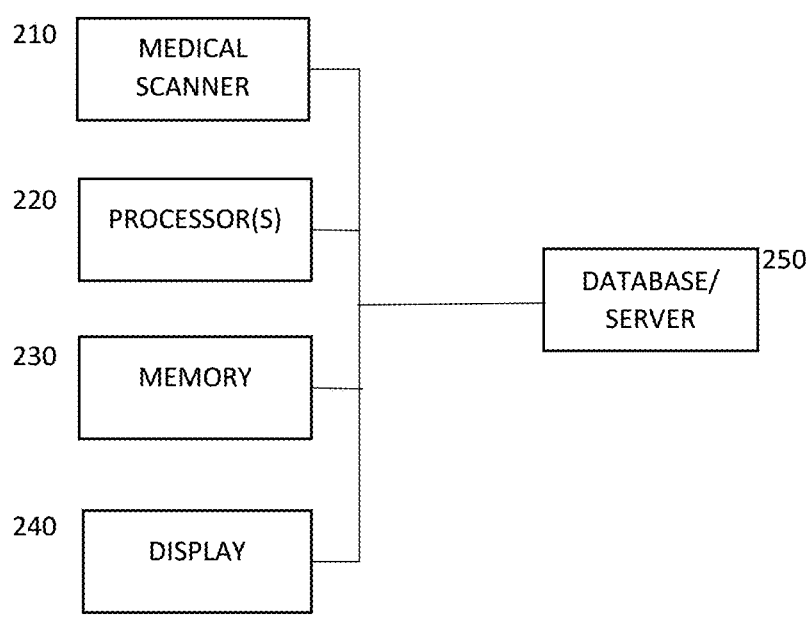
FIG. 2 shows a block diagram illustrating an example of a system according to embodiments.

FIG. 2 shows an example of a system 200 for determining the equilibrium CEST effect for a multi-slice sequence according to embodiments. The system for carrying out the embodiments of the methods disclosed herein is not limited to the system shown in FIG. 2. Other systems may also be used. It is also to be understood that the system 200 may omit any of the modules illustrated and/or may include additional modules not shown.

By way of example, the system 200 may include the server 250 and a computer system (e.g., processor 220, memory 230, and display 240) or a medical scanner 210 (e.g., MR scanner capable of CEST imaging) with the computer system. In another example, the system is a computer or workstation instead of the medical scanner 210, instead of the server 250, or instead of both. In another example, the processor 220, memory 230, and display 240 may be part of the medical scanner 210. In a further example, the processor 220, memory 230, and display 240 may be a part of an archival and/or image processing system, such as associated with a medical records database workstation or server, separate from the medical scanner 210. In other examples, the processor 220, memory 230, and display 240 may be a personal computer, such as a desktop or laptop, a workstation, or combinations thereof. The processor 220, display 240, and memory 230 may be provided without other components for acquiring data by scanning a patient.

The system 200 shown in FIG. 2 may include any number of modules that communicate with each other through electrical or data connections (not shown). In some embodiments, the modules may be connected via any network (e.g., wired network, wireless network, or any combination thereof).

In some embodiments, the system may include one or more processors 220. The processor(s) 220 may include one or more processing units, which may be any known processor or a microprocessor. For example, the processor(s) may include any known central processing unit (CPU), imaging processing unit, graphical processing unit (GPU) (e.g., capable of efficient arithmetic on large matrices encountered in deep learning models), among others, or any combination thereof. The processor(s) 220 may be coupled directly or indirectly to one or more computer-readable storage media (e.g., memory) 230. The memory 230 may include random access memory (RAM), read-only memory (ROM), disk drive, tape drive, etc., or any combinations thereof. The memory 230 may be configured to store programs and data, including data structures. In some embodiments, the memory 230 may also include a frame buffer for storing data arrays.

In some embodiments, another system may assume the data analysis, image processing, or other functions of the processor(s) 220. In response to commands received from an input device, the programs or data stored in the memory 230 may be archived in long-term storage or may be further processed by the processor and presented on the display 240.

In some embodiments, the disclosed methods (e.g., FIG. 1) may be implemented using software applications that are stored in a memory and executed by the one or more processors (e.g., CPU and/or GPU). In some embodiments, the disclosed methods may be implemented using software applications that are stored in memories and executed by one or more processors distributed across the system.

As such, any of the modules of the system 200 may be a general-purpose computer system, that becomes a specific purpose computer system when executing the routines and methods of the disclosure. The systems and/or modules of the system 200 may also include an operating system and micro instruction code. The various processes and functions described herein may either be part of the micro instruction code or part of the application program or routine (or any combination thereof) that is executed via the operating system.

If written in a programming language conforming to a recognized standard, sequences of instructions designed to implement the methods may be compiled for execution on a variety of hardware systems and for interface to a variety of operating systems. In addition, embodiments are not described with reference to any particular programming language. It will be appreciated that a variety of programming languages may be used to implement embodiments of the disclosure. An example of hardware for performing the described functions is shown in FIG. 1. It is to be further understood that because some of the constituent system components and method steps depicted in the accompanying figures can be implemented in software, the actual connections between the systems components (or the process steps) may differ depending upon the manner in which the disclosure is programmed. Given the teachings of the disclosure provided herein, one of ordinary skill in the related art will be able to contemplate these and similar implementations or configurations of the disclosure.

EXAMPLES

Now, having described the embodiments of the disclosure, in general, the examples describe some additional embodiments. While embodiments of the present disclosure are described in connection with the examples and the corresponding text and figures, there is no intent to limit embodiments of the disclosure to these descriptions. On the contrary, the intent is to cover all alternatives, modifications, and equivalents included within the spirit and scope of embodiments of the present disclosure. In particular, Examples 1 and 2 describe the use of methods according to embodiments for a spin echo sequence and gradient echo sequence, respectively, but other sequences can be used as well.

Example 1: Spin Echo Sequence

Introduction

Chemical exchange saturation transfer (CEST) MRI provides a sensitive contrast mechanism for detecting the 'invisible' dilute labile groups via their exchange with the abundant bulk water protons. The CEST effect is measured as a loss of water signal, the magnitude of which confers image sensitivity to labile proton concentration and exchange rate. Because the chemical exchange is often pH-dependent, CEST MRI provides a non-invasive in vivo pH-weighted imaging approach. Specifically, the endogenous amide proton transfer-weighted (APTw) MRI is pH-dependent, promising to detect tissue acidification after acute stroke. In addition, pH MRI has been postulated to complement diffusion and perfusion MRI to stratify heterogeneous ischemic tissue insult, with some initial success in early clinical translation. Continued technical progress has been accomplished in improving the spatial coverage, specificity, and quantification of CEST imaging.

Despite its increasing use, pH-weighted MRI is susceptible to multiple confounding factors. The CEST MRI effect reflects a balance of signal decrease due to saturation transfer and signal recovery via T1 relaxation. As such, the CEST measurement has a complex dependence on the radiofrequency (RF), saturation time (Ts), relaxation delay (Td), and flip angle. Although long Ts and Td are desired for modeling the CEST signal, they are often shortened experimentally to minimize the scan time. Therefore, it is not straightforward to isolate T1-weighting from CEST MRI measurement, particularly at the non-steady-state. The situation is further complicated due to a non-negligible T1 change following acute stroke, which, if not accounted for, confounds the origin of amide proton exchange with the nuclear overhauser enhancement (NOE) effect. As a result, the APTw MRI has a complex dependence on scan parameters and tissue properties. Recently, a quasi-steady-state (QUASS) CEST analysis has been established to derive the equilibrium CEST effect (i.e., long Ts and Td) from the experimental measurements, improving the quantification of the underlying CEST system. Kim et al. examined QUASS CEST MRI for a CEST sequence with a multi-slice readout after a single RF saturation pulse (See, e.g., Kim H, Krishnamurthy L C, Sun P Z. Demonstration of fast multi-slice quasi-steady-state chemical exchange saturation transfer (QUASS CEST) human brain imaging at 3T. Magn Reson Med 2022; 87(2): 810-819). Although multi-slice readout can be obtained after a single RF labeling pulse, each subsequent slice suffers an additional loss of CEST effect due to post-saturation delay. Hence, the current work generalized the QUASS CEST solution to a modified sequence that includes a long primary RF saturation, followed by interleaved multi-slice image readout and short secondary saturation pulses (Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594). The use of repeated secondary labeling RF has been shown to be advantageous to maintaining CEST contrast for multi-slice readout. Both numerical simulation (3-pool) and an animal model of acute stroke have been utilized to test the generalized QUASS CEST imaging, laying the groundwork for future clinical translation.

Theory

The QUASS calculation models the impacts of experimental parameters on the CEST signal. The equilibrium CEST effect can be calculated from the experimental measurements by solving the QUASS spinlock relaxation rate despite not-sufficiently long Ts and Td.

The original QUASS algorithm was developed for a CEST sequence with a single RF saturation followed by a fast image readout. The study in this example aims to generalize the derivation to a modified multi-slice CEST MRI sequence that includes a long primary RF saturation, followed by interleaved multi-slice image readout, signal average, and short secondary saturation pulses. For the modified CEST MRI sequence, the first round of MRI signal relaxes under the Td, Ts1, and slice-dependent Ts2, while the rest of the signal averages have identical effective relaxation for all slices. Therefore, the control scan without RF saturation can be shown to be $$I_0^{app}(i,N,NA) \approx (1-e^{-R_{1w} \cdot [(Td+Ts1)+Ts2 \cdot (i-1)]}) + \Sigma_2^{NA} (1-e^{-R_{1w} \cdot [N \cdot Ts2]}) \quad (1.1)$$

where i is the ith slice, N is the total number of slices, and NA is the number of signal averages. The signal was also derived for the saturated scans by summing the first acquisition and the rest of the signal averaging readout. We have $$I_{sat}^{app}(i, N, NA) \approx \left(1 - e^{-R_{1w} \cdot Td} - \frac{R_{1w}\cos^2\theta}{R_{1\rho}}\right)e^{-R_{1\rho} \cdot [Ts1 + Ts2*(i-1)]} + \frac{R_{1w}\cos^2\theta}{R_{1\rho}}\left\{1 + \sum_{2}^{NA}\left(1 - e^{-R_{1\rho} \cdot [N \cdot Ts2]}\right)\right\} \quad (1.2)$$

in which $$\theta = \operatorname{atan}\left(\frac{\gamma B_1}{\Delta\omega}\right),$$

$\gamma$ is the gyromagneuc ratio, and $R_1$ and $R_2$ are the bulk tissue water longitudinal and transverse relaxation rates. In addition, $B_1$ and $\Delta\omega$ are the amplitude and offset of the RF irradiation. Altogether, the apparent Z spectrum (also referred to as normalized spectrum") for the modified CEST sequence is given as, $$Z^{app} = \frac{\left(1 - e^{-R_{1w} \cdot Td}\right)e^{-R_{1\rho} \cdot [Ts1 + Ts2*(i-1)]} + \frac{R_{1w}\cos^2\theta}{R_{1\rho}}\left(1 - e^{-R_{1\rho} \cdot [Ts1 + Ts2*(i-1)]}\right) + \frac{R_{1w}\cos^2\theta}{R_{1\rho}}\left\{\sum_{2}^{NA}\left(1 - e^{-R_{1\rho} \cdot [N \cdot Ts2]}\right)\right\}}{\left(1 - e^{-R_{1w} \cdot [(Td+Ts1)+Ts2*(i-1)]}\right) + \sum_{2}^{NA}\left(1 - e^{-R_{1w} \cdot [N \cdot Ts2]}\right)} \quad (1.3)$$

The QUASS CEST MRI solves the spinlock relaxation rate ($R_{1\rho}^{QUASS}$) from the apparent Z-spectrum, from which the equilibrium CEST effect is calculated as $$Z^{QUASS} = \frac{R_1 \cdot \cos^2\theta}{R_{1\rho}^{QUASS}} \quad (1.4)$$

Methods

Simulation

Figure 11:
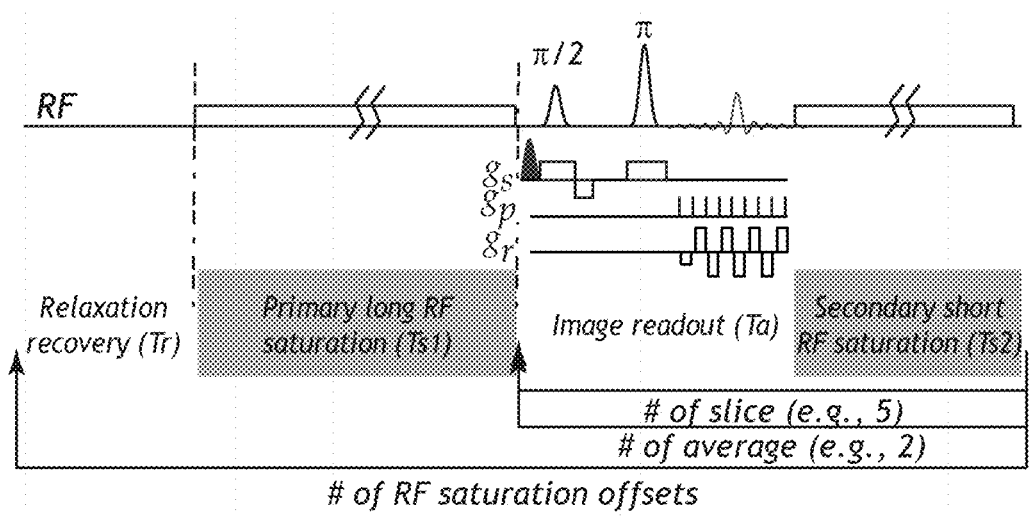
FIG. 11 shows an example of a fast multislice CEST MRI sequence. It includes a relaxation delay time (Td), a long primary saturation time (Ts1), followed by short secondary RF saturation times (Ts2) that is repeated between multislice spin echo EPI readout and signal averaging loop.

We simulated the CEST effect using classical 3-pool Bloch McConnell (B M) equations (see, e.g., Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594) in MATLAB 2021a (Mathworks, Natick MA) for a modified multislice CEST MRI sequence, as shown in FIG. 11. Specifically, the sequence includes a relatively long primary saturation module (Ts1), so the CEST signal reasonably approaches its equilibrium state, followed by a secondary RF saturation module of moderate duration (Ts2) to maintain the CEST effect between multislice readout and signal averaging. We assumed representative $T_1$ of 1.5 s, 1 s, and 1 s for bulk water, amide proton, and semisolid macromolecules, with their $T_2$ being 50 ms, 10 ms, and 10 µs, respectively. The exchange rates were assumed to be 100 $s^{-1}$ for amide protons (3.5 ppm) and 23 $s^{-1}$ for semisolid magnetization transfer (MT) at 0 ppm, with their fraction ratio being 0.125% and 13.9%, respectively. We simulated the parameters used in the experiment, being 5 slices and 2 averages ($B_1$=0.75 µT at 4.7 Tesla), under two conditions: 1) Td=3.5 s, Ts1=3 s, and Ts2=0.5 s (same parameters as used in the in vivo scans); 2) Td=10 s, Ts1=10 s, and Ts2=10 s (serving as the equilibrium reference).

Animals

In vivo studies have been approved by the Institutional Animal Care and Use Committee. We performed multiparametric MRI scans in 7 adult male Wistar rats following acute stroke, with anesthesia maintained between 1.5-2% isoflurane and air mixture (1-1.5 liter/min) for the duration of the stroke surgery and imaging. The heart rate and blood oxygen saturation were monitored (Nonin Pulse Oximeter 8600, Plymouth, MN), with their core temperature maintained with a warm water jacket surrounding the torso. The middle cerebral artery (MCA) occlusion was induced by gently inserting a 4-0 silicone-coated nylon filament through the internal carotid artery to the origin of the MCA. Stroke rats were imaged between 1-3 hours after acute ischemia.

MRI

All MRI scans were performed at a 4.7 Tesla small-bore MRI system (Bruker Biospec, Ettlingen, Germany). We used single-shot spin echo planar imaging (EPI) with a field of view (FOV) of 25×25 $mm^2$ (matrix=64×64, slice thickness/slice gap=1.8/0.2 mm, 5 slices). We acquired multiparametric MRI scans, including diffusion-weighted, $T_1$-weighted, $T_2$-weighted, and CEST Z-spectral imaging. Specifically, $T_1$-weighted inversion recovery images were acquired with inversion times ranging from 250 to 2750 ms (relaxation delay (Td)/echo time (TE)=6000/30 ms, 4 averages, scan time-3 min 25 s). $T_2$-weighted spin echo images were acquired with separate spin echo times, with two echo times being 30 and 100 ms (repetitio time (TR)=3000 ms, 8 averages, scan time=48 s). In addition, diffusion imaging was obtained with a single-shot isotropic diffusion-weighted MRI (two b-values of 250 and 1000 s/$mm^2$, TR/TE=3250/42 ms, 16 averages, scan time=1 min 44 s). We used a CEST MRI sequence with an unevenly segmented RF irradiation. See, e.g., Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594. We collected Z-spectrum from −6 to 6 ppm with intervals of 0.05 ppm ($B_1$=0.75 µT, Td=3500 ms, Ts1=3000 ms, Ts2=500 ms, 2 averages, scan time=42 min 36 s). We chose 0.75 µT, a relatively weak RF saturation amplitude, to maximize the pH-weighted APT contrast. The CET scan time is relatively long due to the acquisition of densely sampled CEST images (i.e., 241 offsets). The total scan time is provided (scan time=[Ts1+Td+(Ts2*the number of slices) *the number of averages]*the number of offsets). The use of repeated secondary labeling RF is advantageous to maintaining CEST contrast for multi-slice readout.

Data Analysis

Images were processed in Matlab R2021a (Mathworks, Natick, MA). Parametric $T_1$, $T_2$, and apparent diffusion coefficient (ADC) maps were obtained using least-squares mono-exponential fitting of the signal intensities as functions of the inversion time, echo time, and diffusion b values, as described before in Ji Y, Lu D, Jiang Y, Wang X, Meng Y, Sun P Z. Development of fast multi-slice apparent T1 mapping for improved arterial spin labeling MRI measurement of cerebral blood flow. Magn Reson Med 2021; 85(3): 1571-1580. The $B_0$ field inhomogeneity was determined from the Z-spectrum scan due to its fine frequency density. The Z spectrum was analyzed using the unsaturated scan-denominated normalization $$\left(\text{i.e., } Z = \frac{I(\Delta\omega)}{I_0}\right),$$

in which $I(\Delta\omega)$ is the signal intensity with RF saturation applied at $\Delta\omega$, and $I_0$ is the control scans without RF saturation. The Z-spectra were also analyzed with the inverse Z-spectral analysis (i.e., $$\left(\text{i.e., } Z_{inv} = \frac{I_0}{I(\Delta\omega)}\right).$$

The direct water saturation (DWS) effect was calculated as $$Z^{DWS} = \frac{R_1\cos^2\theta}{R_1\cos^2\theta + R_2\sin^2\theta}, \quad (1.5)$$

The DWS exchange spectrum was calculated as, $$R_{ex}^{DWS}(\Delta\omega)=R_1\cos^2\theta+R_2\sin^2\theta \quad (1.6)$$

The CEST exchange spectrum was calculated as $$R_{ex}(\Delta\omega)=R_1\cdot\cos^2\theta\cdot Z_{inv}-R_{ex}^{DWS}(\Delta\omega) \quad (1.7)$$

Diffusion lesion was segmented using a K-means clustering algorithm. The ipsilateral ischemic lesion was mirrored along the midline to the contralateral brain as the reference region of interest. The change in $R_{ex}$ was calculated as the difference between $R_{ex}$ of the ischemic lesion and the contralateral normal area ($\Delta R_{ex}=R_{ex}^{ischemic}-R_{ex}^{normal}$).

We applied Lorentzian fitting to resolve multi-pool contribution to Z-spectra using the equation $$Z = \frac{R_1\cos^2\theta}{R_1\cos^2\theta + R_2\sin^2\theta + \sum_{i=1}^{N}\frac{A_i}{\left(1+4\left(\frac{\Delta\omega-\delta_i}{\sigma_i}\right)^2\right)}} \quad (1.8)$$

where $A_i$, $\delta_i$, and $\sigma_i$ are the amplitude, chemical shift, and full-width-half-maximum (FWHM) of the $i^{th}$ labile proton group. We used 7 labile groups, including semi-solid MT (0 ppm), amide (3.5 ppm), amine (3 ppm), guanidyl (2 ppm), NOE (−1.6 ppm), NOE (−2.75 ppm), and NOE (−3.5 ppm) pools. Also, we used experimentally measured $R_1$ and $R_2$ relaxation rates to minimize the number of free parameters. The upper and lower boundaries are from 0 to 150% of the initial guesses for the amplitudes, ±25% for the FWHM, with the range for the chemical shifts being ±0.25 ppm, with an extended range of ±2 ppm for the MT pool from the initial values. We used a two-tailed paired t-test with Bonferroni correction, and the results were regarded as statistically significant for adjusted P values less than 0.05.

Results

Figure 3A:
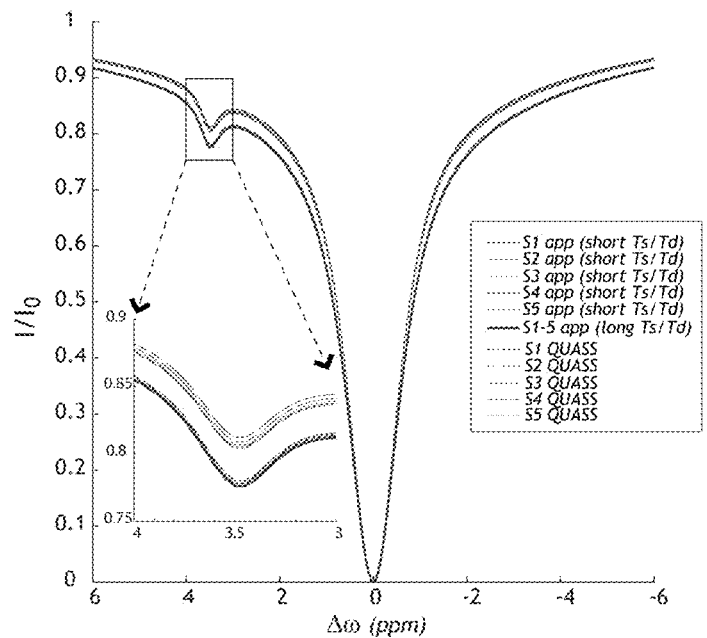
FIGS. 3A and 3B show a simulation of the QUASS algorithm for the modified fast multislice CEST MRI sequence.
Figure 3B:
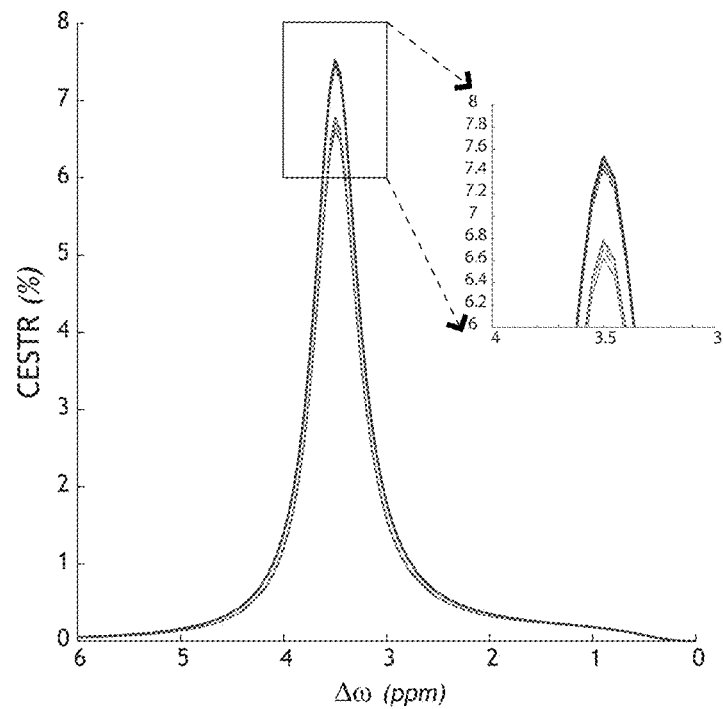

The generalized QUASS algorithm was tested with numerical simulation for the fast multislice CEST MRI sequence. The effective Td and Ts were derived per slice because they vary with slices. FIG. 3A shows the apparent Z-spectra for each of the five slices were relatively close to each other, with slices 1 to 5 represented in different shades of gray, respectively. The Z-spectrum under the condition of long Ts and Td was noticeably more attenuated from the apparent Z-spectra. This difference is expected because the equilibrium state experiences more saturation transfer than under the condition of insufficiently long Ts. The corresponding QUASS reconstructed Z-spectra were shown in dashed lines, overlapping the equilibrium Z-spectral simulation. FIG. 3B shows the Z-asymmetry spectra, revealing slice-dependent magnitude in the CEST effect. Again, the reconstructed QUASS asymmetry spectra and equilibrium asymmetry spectra (long Td, Ts1, and Ts2) overlapped, validating the generalized QUASS solution.

Figure 4A:
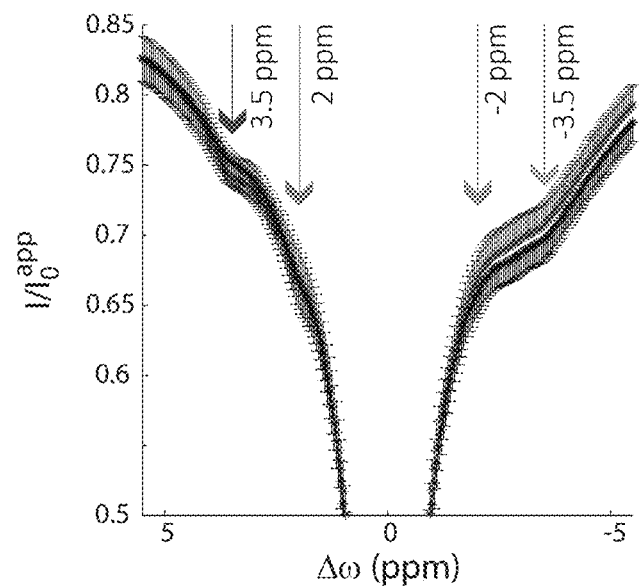
FIGS. 4A-F show the analysis of apparent CEST Z-spectra.
Figure 4B:
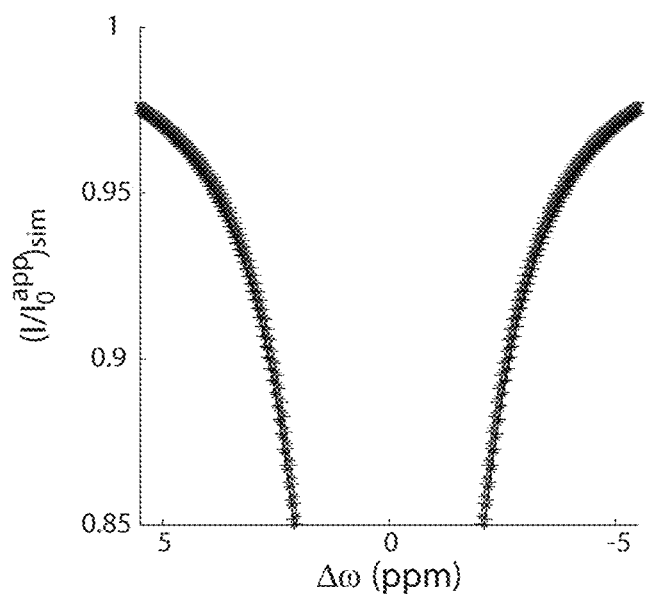
Figure 4C:
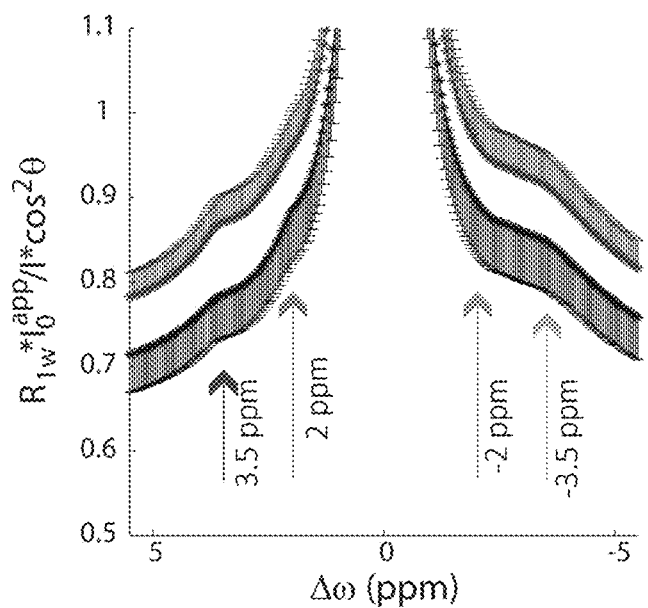
Figures 12A, 12B, 12C:
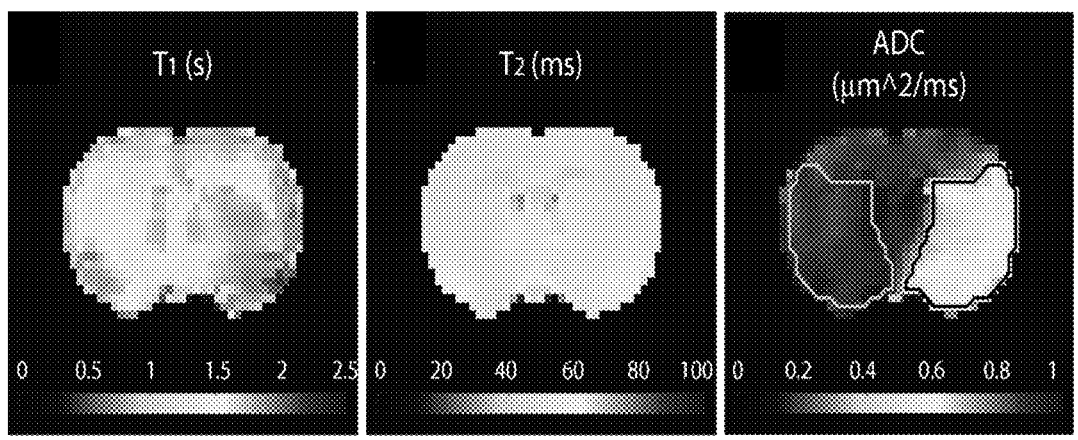
FIGS. 12A-C show multiparametric images from a representative acute stroke rat.

Multiparametric images of a representative acute stroke image are shown in FIGS. 12A-12C. $T_1$ map (FIG. 12A) showed a small yet significant $T_1$ increase in the ipsilateral ischemic lesion from the contralateral normal area (1.56±0.04 s vs. 1.72±0.07 s, P<0.05). The $T_2$ map (FIG. 12B) also showed a small yet significant increase, from 54.77±0.95 ms to 56.17±1.13 ms (P<0.05). In addition, the diffusion map (FIG. 12C) shows ADC drop in the ischemic lesion, from 0.85+0.04 µm²/ms to 0.53+0.04 µm²/ms. FIGS. 4A-F compare the Z-, inverse Z, $R_{ex}$-, and $\Delta R_{ex}$-spectra from the routine CEST analysis. FIG. 4A shows the apparent Z-spectra from the contralateral normal and ipsilateral ischemic area. The DWS spectra were simulated using Eq. 1.5, which showed a very small drop in acute ischemic tissue, suggesting DWS is not sensitive to a small $T_1$ change due to the normalization $$\left(\frac{R_1\cdot\cos^2\theta}{R_1\cdot\cos^2\theta + R_2\cdot\sin^2\theta} = \frac{1}{1+R_2/R_1\cdot\tan^2\theta}\right).$$

Figure 4D:
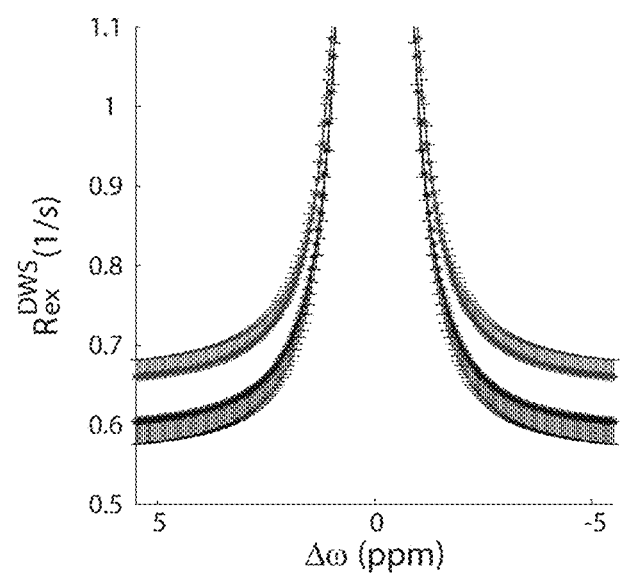
Figure 4E:
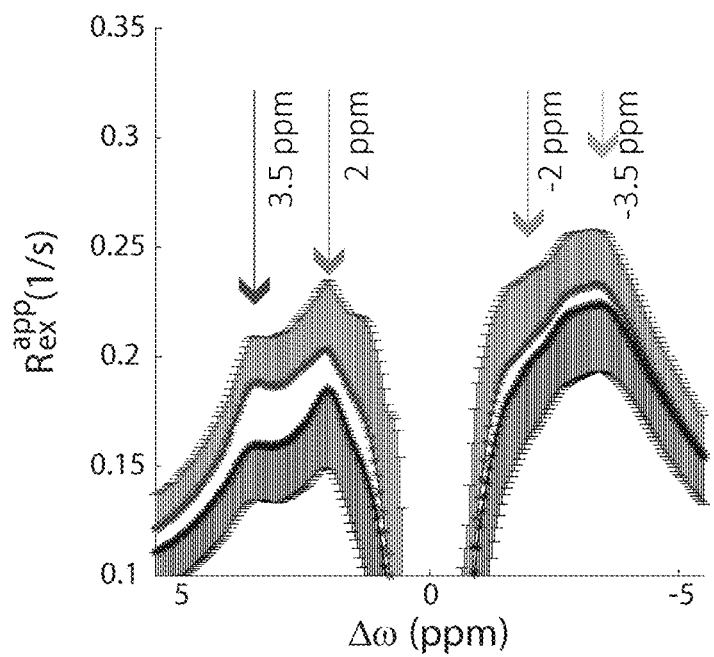
Figure 4F:
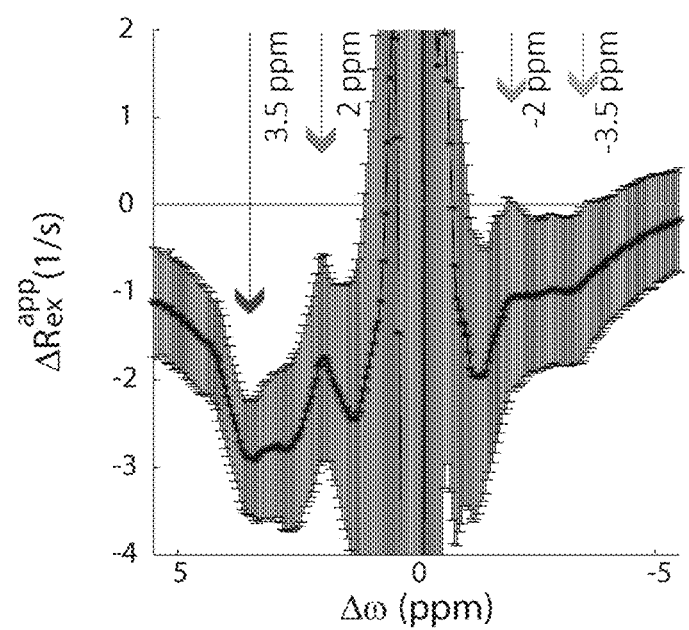

The $T_1$-normalized inverse Z spectrum calculated from Eq. 1.7 showed a broad baseline drop in the ischemic tissue (FIG. 4C) from the contralateral normal area. The simulated $R_{ex}^{DWS}$ (i.e., $R_1\cdot\cos^2\theta+R_2\cdot\sin^2\theta$) spectra showed that the baseline drop was primarily attributed to decreases in ischemic tissue relaxation rates. The CEST/MT exchange spectra excluding the DWS effect were shown in FIG. 4E, which showed that most of the differences between the normal and ischemic tissues are around 3.5 ppm, amide proton offset instead of NOE effect −3.5 ppm. FIG. 4F shows the CEST/

MT $R_{ex}$ difference ($\Delta R_{ex}$) between the normal area and ischemic lesion, confirming that APT signal change dominates that of NOE.

Figure 5A:
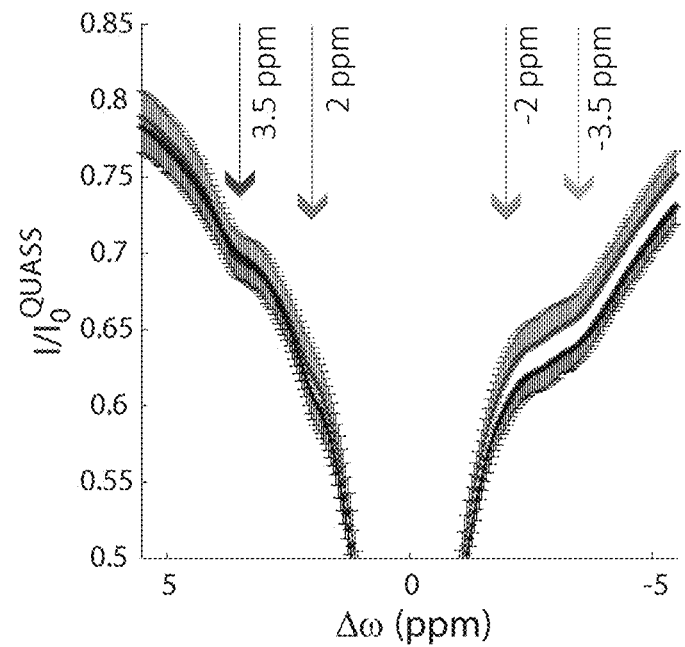
FIGS. 5A-C show the analysis of QUASS CEST Z-spectra.
Figure 5B:
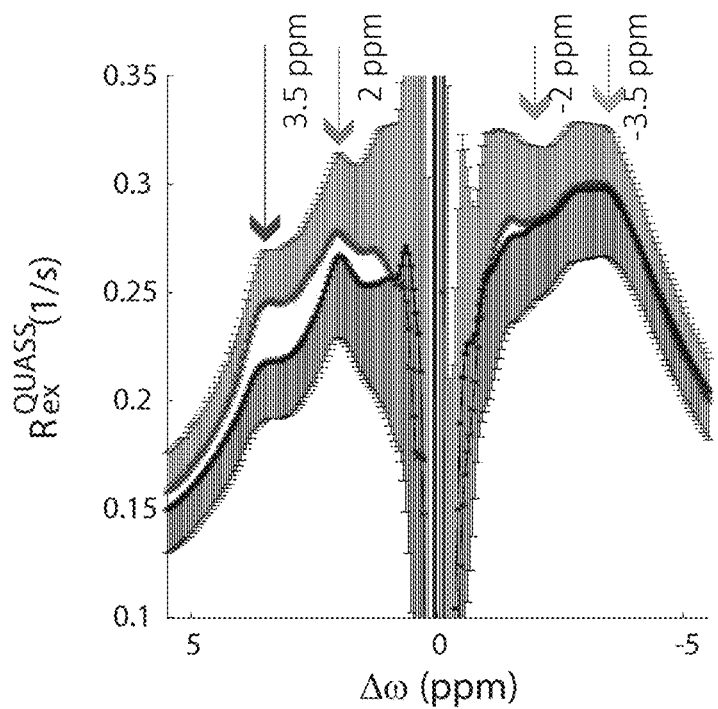
Figures 5C, 6:
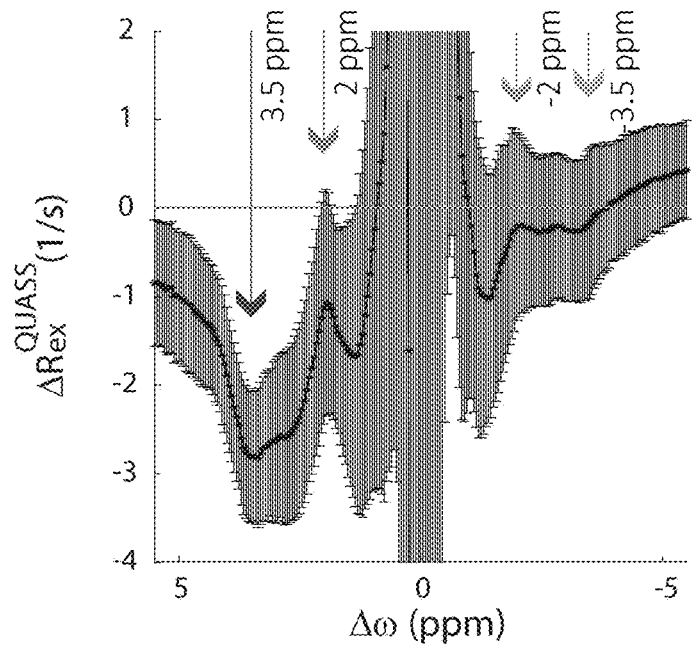
FIG. 6 shows a table comparing multiparametric pH-weighted indices after acute stroke with and without QUASS analysis.
Figure 13A:
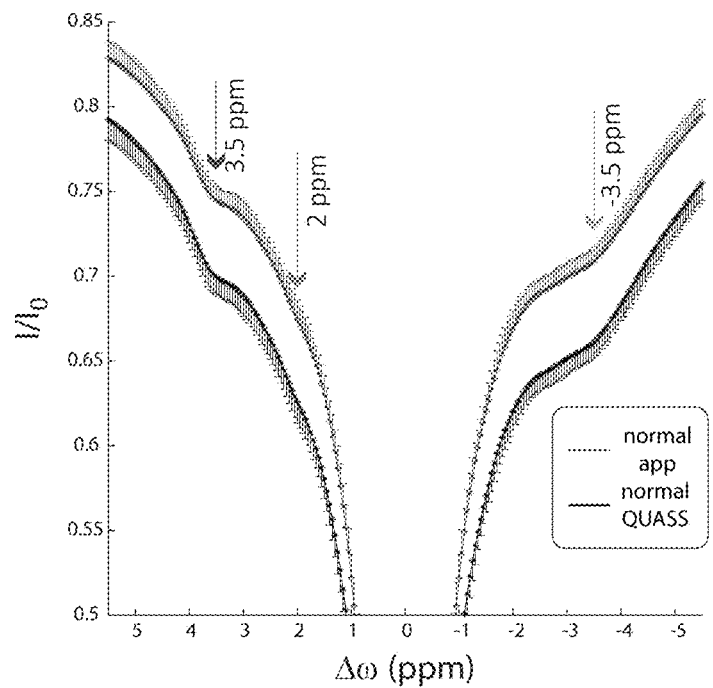
FIGS. 13A and B show a comparison of apparent and QUASS Z-spectra.
Figure 13B:
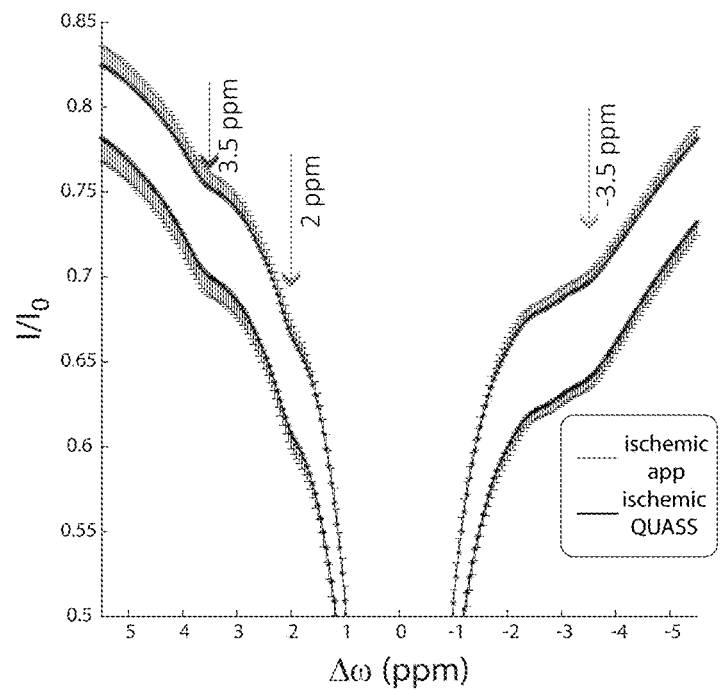
FIG. 13B shows the apparent and QUASS Z-spectra from the ischemic lesion.

We also analyzed the QUASS CEST results. FIG. 5A shows the QUASS Z-spectra for the contralateral normal and ischemic tissue. FIGS. 13A and B compare routine and QUASS Z-spectra, showing further QUASS Z-spectral attenuation in the normal (FIG. 13A) and ischemic tissue (FIG. 13B) from the corresponding routine Z spectra. This difference is because routine Z spectra were acquired under not sufficiently long Ts and Td, while the QUASS processing restores the equilibrium CEST effects, similar to the simulated results (FIG. 3A). FIG. 5B displayed $R_{ex}$ spectra, removing $R_{ex}^{DWS}$ calculated from measured relaxation times to account for CEST/MT effects changes. In contrast to Z-spectra, $R_{ex}$-spectra show little intensity change in the high field shifts, with most of the differences originating from around the amide chemical shift (FIG. 6). This result agreed with prior findings that the relaxation change causes a baseline drop, introducing an apparent Z-spectral signal decrease at aliphatic chemical shifts (see, e.g., Wu L, Jiang L, Sun P Z. Investigating the origin of pH-sensitive magnetization transfer ratio asymmetry MRI contrast during the acute stroke: Correction of T1 change reveals the dominant amide proton transfer MRI signal. Magn Reson Med 2020; 84(5):2702-2712). In addition, due to the correction of the incomplete saturation transfer effect, QUASS $R_{ex}$ spectra are consistently higher than the apparent $R_{ex}$ spectra, particularly close to the bulk water resonance. The $\Delta R_{ex}$ spectra between the contralateral normal and ischemic lesion are shown in FIG. 5C. Indeed, $\Delta R_{ex}^{QUASS}$ (−3.5 ppm) is not statistically different from 0 (−0.00±0.01).

Figure 7A:
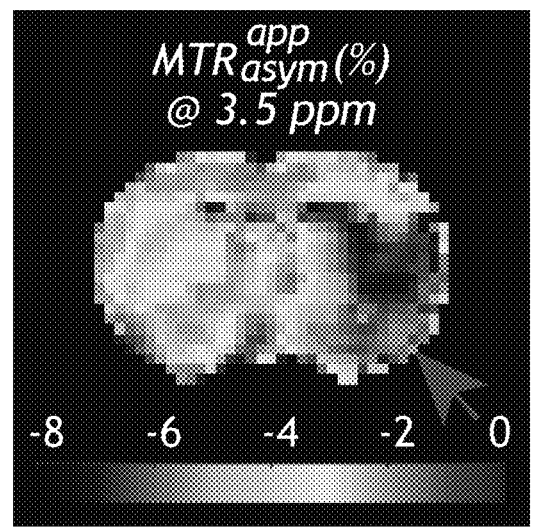
FIGS. 7A-F show a comparison of apparent and QUASS CEST images.
Figure 7B:
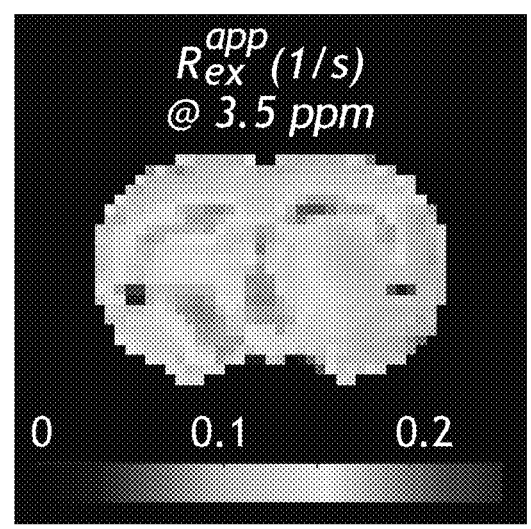
Figure 7C:
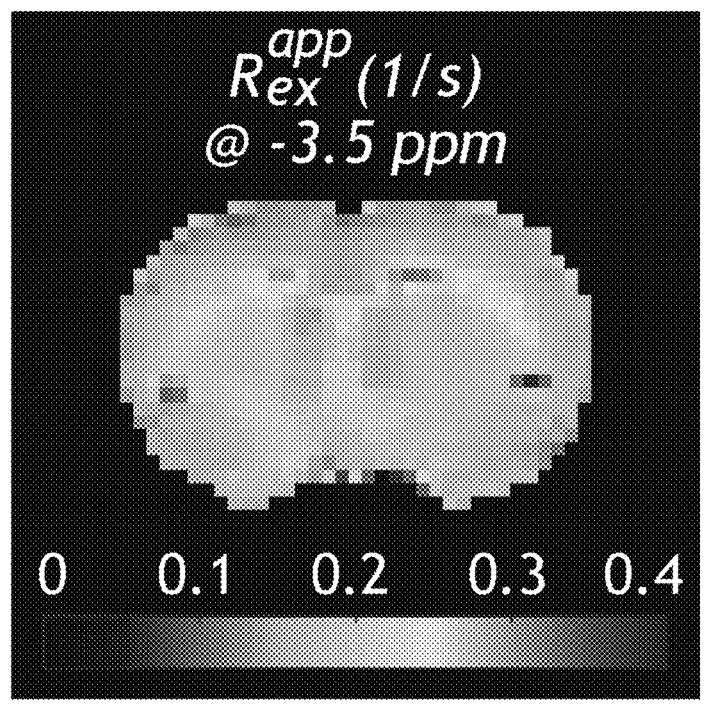
Figure 7D:
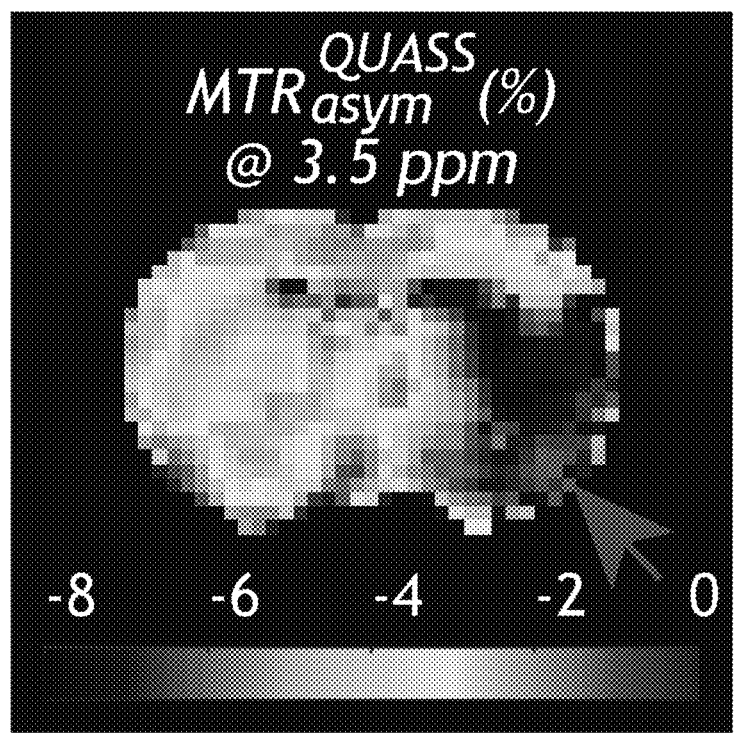
Figure 7E:
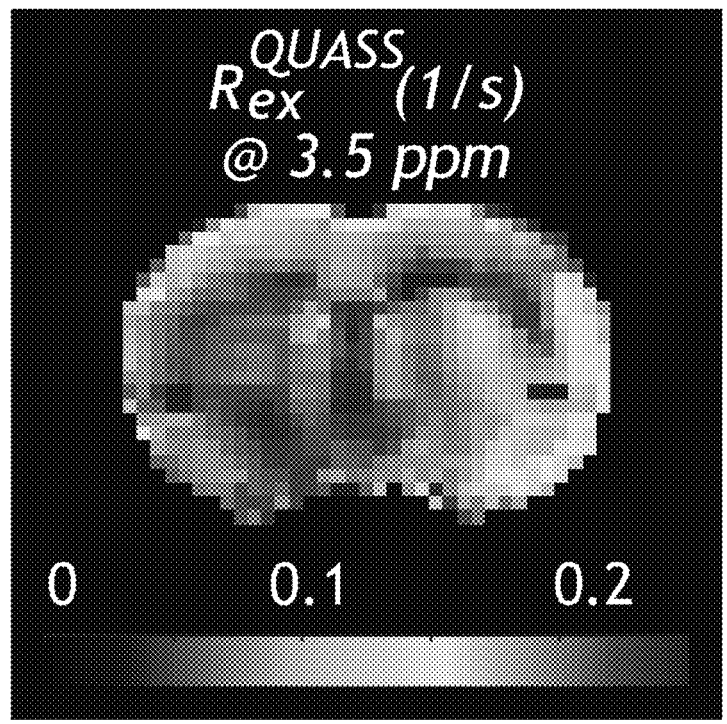
Figure 7F:
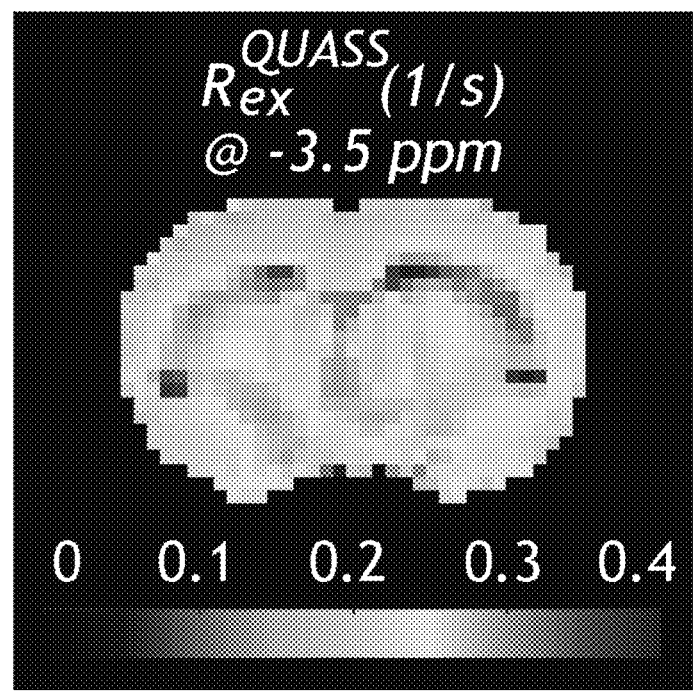

The apparent and QUASS $MTR_{asym}$ and CEST/MT $R_{ex}$ images were compared. FIGS. 7A and 7D display $MTR_{asym}$ images calculated from the apparent and QUASS Z-spectra, respectively. The QUASS processing resulted in a more ischemia-induced signal drop (red arrow, FIG. 7D) from the routine image (FIG. 7A). The apparent $MTR_{asym}$ was −3.46±0.62% and −5.53±0.68% for the contralateral normal and ischemic areas, respectively, with a difference of −2.07±0.52%. The corresponding QUASS $MTR_{asym}$ was −3.67±0.66% and −5.94±0.73%, respectively, with a difference of −2.27±0.57%. In addition, the apparent and QUASS $R_{ex}$(+3.5 ppm) images were shown in FIGS. 7A and 7E, respectively, with corresponding $R_{ex}$(−3.5 ppm) images in FIGS. 7C and 7F. It is worth noting that QUASS $R_{ex}$ images were consistently higher than the apparent $R_{ex}$ images, with the ischemic lesion showing notable $R_{ex}$(+3.5 ppm) hypointensity.

Figure 9A:
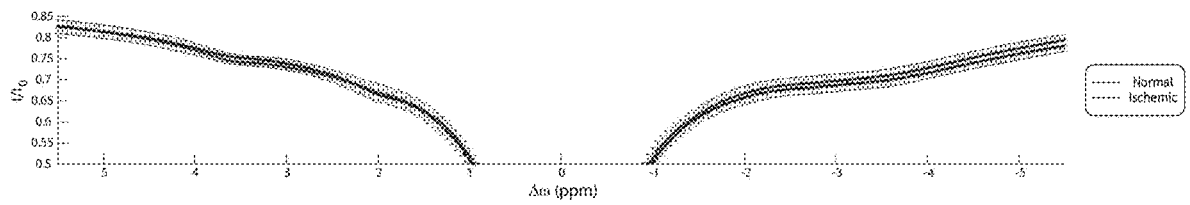
FIGS. 9A-C show Lorentzian fitting of the apparent Z-spectra.
Figure 9B:
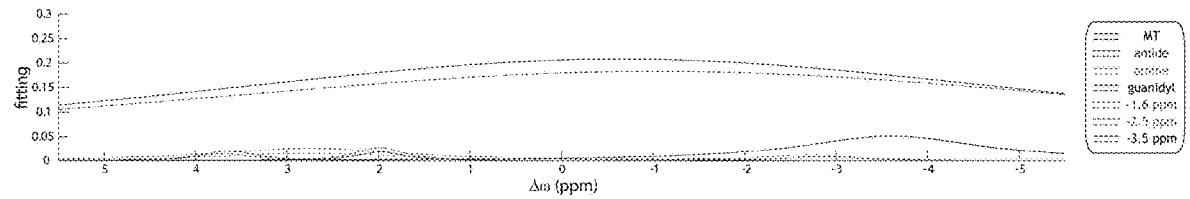
Figure 9C:
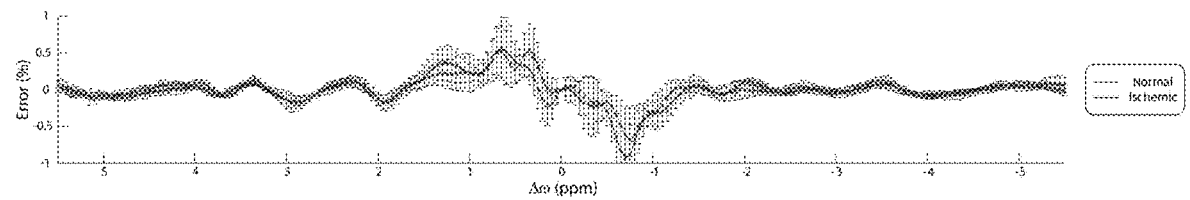
Figure 10A:
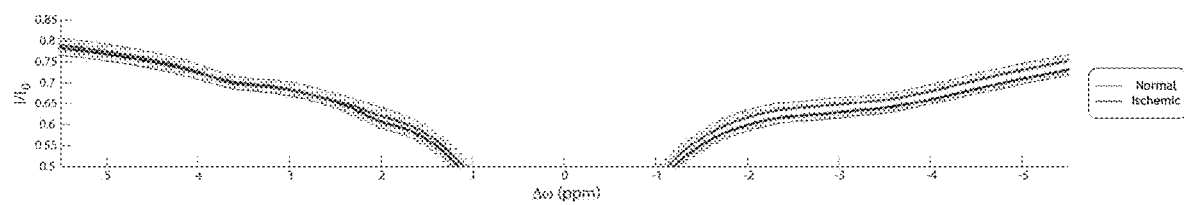
FIGS. 10A-C show Lorentzian fitting of the QUASS Z-spectra.
Figure 10B:
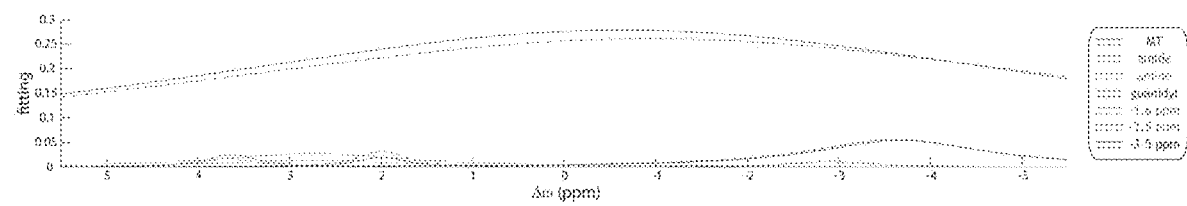
Figure 10C:
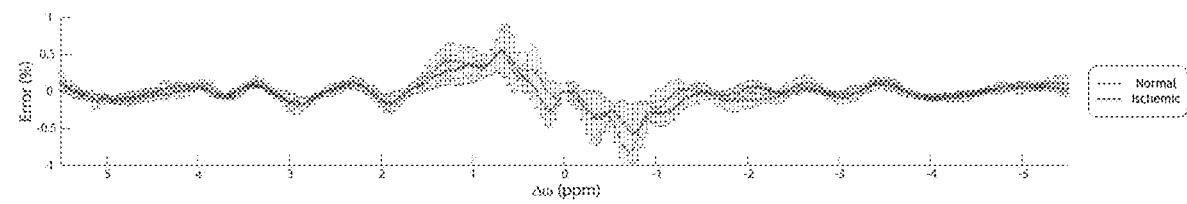

Because $R_{ex}$ reflects the combined changes of the baseline and labile proton signals, we further applied Lorentzian fitting to isolate multi-pool CEST contribution from the ischemic lesion and the contralateral normal area (FIG. 8). The mean and standard deviation of Lorentzian fitting from the apparent and QUASS Z-spectra (normal (solid lines) and ischemic (dash-dotted lines)) were shown in FIGS. 9A and 10A, with isolated peaks (FIGS. 9B and 10B) and the differences between fitting and data (FIGS. 9C and 10C). The root-mean-square deviation (RMSD) for all fitting was under 0.25%, suggesting good fitting. It is worth noting that QUASS analysis detected significant signal changes in MT, amide, and guanidyl pools. Briefly, the amplitude of the MT pool was (20.83±2.41%/s (normal) vs. 18.34±2.75%/s (ischemia), P<0.05) from the apparent CEST solution, while they were 27.86±2.57%/s and 26.12±2.97%/s (P<0.05) from QUASS analysis. In addition, the apparent amide peaks decreased from 2.14±0.29%/s to 1.45±0.20%/s (P<0.05), following ischemia, with the corresponding QUASS amide peaks being 2.61±0.34%/s and 1.78±0.21%/s (P<0.05), respectively. Also, the apparent guanidyl signal increased from 1.84±0.28%/s to 2.80±0.39%/s (P<0.05) following ischemia, while the QUASS guanidyl signal increased from 2.09±0.38%/s and 3.28±0.44%/s (P<0.05).

Discussion

Our study extended the QUASS algorithm to describe a modified fast multislice CEST MRI sequence. Capitalizing on a densely sampled Z-spectrum from an acute ischemic rodent model, we found that the QUASS reconstruction enhances pH-weighted $MTR_{asym}$ contrast to depict the ischemic insult over the routine Z-spectral analysis. Consistent with prior studies (e.g., Jin T, Wang P, Zong X, Kim S G. MR imaging of the amide-proton transfer effect and the pH-insensitive nuclear overhauser effect at 9.4 T. Magn Reson Med 2013; 69(3): 760-770; and Wu L, Jiang L, Sun P Z. Investigating the origin of pH-sensitive magnetization transfer ratio asymmetry MRI contrast during the acute stroke: Correction of T1 change reveals the dominant amide proton transfer MRI signal. Magn Reson Med 2020; 84(5):2702-2712), the QUASS $R_{ex}$ spectrum confirmed that APT signal drop dominates NOE signal change, which was negligible after acute ischemia.

The modified sequence has an effective saturation time ranging from 5 s (slice 5, $1^{st}$ average) to 2.5 s ($2^{nd}$ average and beyond), comparable with the typical experimental choice of saturation parameters. We used a numerical simulation of a 3-pool model (amide, MT, and bulk water) to test the generalized QUASS solution. Once the derivation is confirmed with simulation, it is safe to assume the generalized QUASS solution is valid. This is because of prior QUASS experiments, in which we experimentally obtained Z-spectra (phantoms, brain tumor models, and human subjects) with multiple Ts and Td conditions and directly tested if QUASS calculation generated consistent results. The overt difference between the apparent and QUASS Z-spectra shows that the use of moderate Ts and Td impacts the measurement (e.g., $MTR_{asym}$) as well as $R_{ex}$ results. By minimizing the confounding effect of not sufficiently long saturation time and relaxation delay on the CEST measurement, our study provided additional insight into the contrast mechanism of APT MRI in acute stroke. This finding also suggests that $T_1$ contribution to the CEST measurement is not due to DWS Z-spectral difference (FIG. 4B) but because of $R_{ex}^{DWS}$ and $T_1$ scaling (FIG. 4D). The QUASS solution enables the use of well-established spin lock theory to analyze $R_{ex}$ spectra. Also, it is helpful to discuss the implication of QUASS calculation on the signal-to-noise ratio (SNR). The QUASS reconstruction recovers the magnitude of the CEST effect, but SNR is primarily determined by the original CEST signals. Fortunately, the QUASS reconstruction aids experimental optimization and quantification. This is because experimental conditions such as Ts, Td, and flip angle can be optimized for CNR per unit time without concerning the magnitude, hence the accuracy of the measurement, which can be reinstated from QUASS post-processing.

We utilized a 7-pool Lorentzian fitting to describe in vivo Z-spectrum reasonably well. The densely sampled Z-spectra revealed contributions from amine (3 ppm) and NOE (−1.6 ppm) groups, often not observed below 7 T. It is worth pointing out that multi-pool Lorentzian fitting depends on the Z-spectral resolution, SNR, RF saturation amplitude, and duration. Our study chose a weak $B_1$ saturation field of 0.75

µT, which is advantageous because it provides a relatively narrow Z-spectrum to resolve multiple labile proton groups that are somewhat overlapping. Because non-linear fitting is prone to interactions and, hence, inaccuracies, we used experimentally measured relaxation rates to alleviate such interaction so the relaxation changes in the ischemic lesion can be directly accounted for. It is helpful to discuss the contribution of multiple components in pH-weighted MRI contrast in acute stroke. There are significant decreases in semisolid MT, amide, and amine CEST effects with an increase in guanidyl CEST effect following acute stroke. Because MT is not sensitive to pH, MT change is likely due to edema, as evidenced by the $T_1$ increase. Both amide signal decrease and guanidyl signal increase have been associated with pH drop. Whereas neither $MTR_{asym}$ nor $R_{ex}$ spectra show significant changes at 2 ppm, the Lorentzian fitting documented a clear guanidyl signal increase. This discrepancy was likely due to the amine signal drop, which has been postulated to be caused by a decrease in metabolite concentration. In addition, because the guanidyl CEST effect is relatively close to the bulk water resonance, it is susceptible to direct water saturation, which is complex in the presence of $T_1$ and $T_2$ changes. Fortunately, the bandwidth of the guanidyl CEST effect is moderate, which does not affect amide exchange at 3.5 ppm. Because amine protons have a much broader linewidth than the amide exchange, the amide signal benefits from a synergistic decrease in the amine CEST signal. This finding is consistent with $\Delta R_{ex}$ spectral change between ischemic and contralateral normal tissue, which peaked at 3.5 ppm. Future studies at ultrahigh fields will be needed to determine the origin of the observed amine signal in acute stroke.

It is helpful to discuss asymmetry, $R_{ex}$, and Lorentzian fitting analyses. Under the condition of long relaxation recovery and RF saturation, the commonly used asymmetry calculation effectively corrects symmetric signal changes, such as direct RF saturation when the RF saturation is of lower amplitude. It is not straightforward to correct the $T_1$ contribution to the routine MT asymmetry calculation due to the relaxation cross terms $$\left(Z(-) - Z(+) = \frac{R_1 \cos^2\theta \cdot (R_{ex}(+) - R_{ex}(-))}{[R_1\cos^2\theta + R_2\sin^2\theta + R_{ex}(-)][R_1\cos^2\theta + R_2\sin^2\theta + R_{ex}(+)]}\right).$$

In comparison, the inverse Z asymmetry calculation simplifies the $T_1$ correction $$\left(\frac{1}{Z(+)} - \frac{1}{Z(-)} = \frac{R_{ex}(+) - R_{ex}(-)}{R_1 \cos^2\theta}\right).$$

Because the $R_{ex}$ spectrum accounts for relaxation rate changes, it should be more reflective of the underlying CEST changes than the asymmetry calculation. However, when the relaxation time and saturation time are not long enough, the CEST signal has complex dependencies on experimental parameters and $T_1$. Under such conditions, the use of equilibrium or QUASS CEST effects should be considered. In addition, when multiple exchange groups are somewhat overlapping, the asymmetry calculation yields a mixed result. Therefore, although the asymmetry analysis provides a quick analysis, the Lorentzian fitting of the equilibrium/QUASS CEST Z-spectrum is recommended to provide a more accurate quantification of the underlying CEST system. For example, Lorentzian fitting revealed the guanidyl CEST signal change that was not pronounced in the asymmetry and $R_{ex}$ spectral calculations due to contamination from multi-pool CEST effects. It is helpful to point out that a prior study by Zaiss et al. adopted a very long saturation time of 5 s, which is likely close to the equilibrium CEST effects. They reported a signal decrease of about 1% between the ischemic and normal tissue. Note that $AREX \approx R_{ex}(3.5 \text{ ppm}) - R_{ex}(-3.5 \text{ ppm})$. However, using three-point baseline estimation is problematic at non-high fields because $R_{ex}$ is prone to multi-pool contributions when the spectral resolution is not sufficiently high. Although it is not straightforward to compare two studies with different onset times after MCAO (hours vs. days), field strengths, and RF saturation schemes, the Lorentzian fitting showed that ischemia-induced APT signal change was $-0.69 \pm 0.25\%$ (apparent) and $-0.83 \pm 0.30\%$ (QUASS), comparable to AREX calculation at high field with a long Ts.

Conclusion

This study extended the QUASS algorithm to a modified fast multislice CEST MRI sequence with unevenly segmented RF saturation modules. QUASS CEST MRI showed enhanced pH-weighted $MTR_{asym}$ contrast than the apparent CEST measurement after acute stroke. In addition, Lorentzian fitting documented significant decreases in MT and amide signals and an increase in guanidyl signal, with significantly elevated changes using QUASS analysis than the apparent CEST measurement.

Example 2: Gradient Echo Sequence

Introduction

Amide proton transfer-weighted (APTw) MRI has been increasingly adopted for tumor imaging. The APTw signal increases with the glioma grade, which also detects non-contrast-enhancing tumors. Also, APTw MRI is promising to differentiate tumor recurrence from necrosis. Because chemical exchange saturation transfer (CEST) MRI is pH sensitive, it serves as a biomarker for tumor metabolism and response to therapies. Magnetization transfer asymmetry ($MTR_{asym}$) has been conveniently used in vivo to minimize concomitant saturation effects, including direct saturation and magnetization transfer (MT) effects. On the other hand, the asymmetry analysis mixes APT with the nuclear overhauser enhancement (NOE) effect. In addition, the CEST effect reflects a balance between water signal loss due to saturation transfer and signal recovery due to $T_1$ relaxation. However, it is not straightforward to account for $T_1$ contribution under non-equilibrium experimental conditions. As a result, despite the increasing adoption of APTw MRI in oncological applications, its contrast mechanism has not been fully established.

A quasi-steady-state (QUASS) algorithm has been developed recently to reconstruct the desired equilibrium CEST effect, ostensibly with infinite saturation duration, instantaneous readout, and full signal recovery between saturations from experimental data. The QUASS solution overcomes the impact of scan protocol on experimental measurements to solve the underlying CEST signal changes under the same RF amplitude and field strength. Our study aimed to evaluate the multi-pool CEST signal changes under the equilibrium conditions in a rodent brain tumor model. First, we generalized the QUASS CEST solution to a modified sequence that includes a long primary RF saturation, followed by interleaved multi-slice gradient echo readout and short secondary saturation pulses (Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594). Next, we performed multiparametric relaxation, diffusion, and CEST scans in brain tumor animal models. We then applied a 7-pool spinlock model to fit acquired and QUASS-reconstructed CEST Z-spectra and determined the MT, amide, amine, guanidyl, and NOE signals in tumor and normal tissues. Furthermore, we estimated the relative contribution of APT and NOE to the acquired APTw tumor contrast. To summarize, our study generalized QUASS solution to a CEST sequence with two-tiered RF saturation and gradient echo (GE) readout and quantified tumor APTw contrast, laying the groundwork for future translational brain tumor CEST imaging.

Theory

Figure 18:
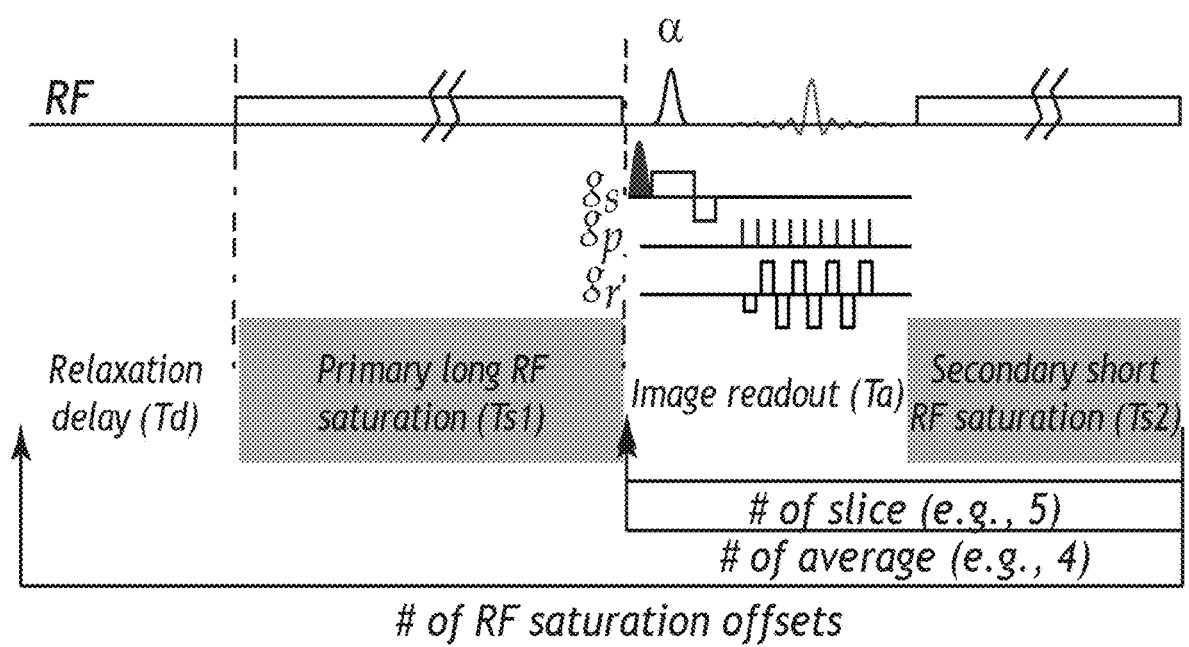
FIG. 18 shows the fast multislice CEST MRI sequence. It includes a relaxation delay time (Td), a long primary saturation time (Ts1), followed by short secondary RF saturation times (Ts2) that is repeated between multislice gradient echo EPI readout and signal averaging loop. FA is the flip angle of GE EPI.

Our work generalized the QUASS solution to a sequence of two-tiered RF saturation with GE echo planar imaging (EPI) readout, as shown in FIG. 18 (Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594). Because GE readout introduces a carryforward signal between signal averaging, an iterative numerical solution is needed, extending a recent QUASS derivation for spin echo readout (Sun P Z. Quasi-steady-state amide proton transfer (QUASS APT) MRI enhances pH-weighted imaging of acute stroke. Magn Reson Med 2022; 88(6):2633-2644). Specifically, the control signal without RF saturation from the first signal average (na=1) for the $i^{th}$ slice is given by $$I_0^{app}(i, ns, na=1) \approx (\cos\alpha \cdot e^{-R_{1w}\cdot[(Td+Ts1)+Ts2*(i-1)]} + 1-e^{-R_{1w}\cdot[(Td+Ts1)+Ts2*(i-1)]})\cdot \sin\alpha \quad (2.1)$$

where i denotes the $i^{th}$ slice of a total of slices (ns), $\alpha$ is the flip angle, $R_{1w}$ is the longitudinal relaxation rate, Td, Ts1, and Ts2 are the relaxation delay, primary RF saturation, and secondary RF saturation duration, respectively. The superscript app denotes the apparent signal that is either simulated or directly acquired. For the second signal average and beyond, the control signal is given as $$I_0^{app}(i, ns, na > 1) \approx \quad (2.2)$$
$$\left\{ I_0^{app}(i, ns, na-1) \cdot \frac{\cos\alpha}{\sin\alpha} \cdot e^{-R_{1w}\cdot[ns\cdot Ts2]} + \left(1 - e^{-R_{1w}\cdot[ns\cdot Ts2]}\right) \right\} \cdot \sin\alpha$$

Note the iterative term (i.e., $I_0^{app}(i, ns, na-1)$) that accounts for the carryforward signal from prior signal averages. The CEST saturated signal is calculated using the spinlock formula (Zaiss M, Bachert P. Exchange-dependent relaxation in the rotating frame for slow and intermediate exchange—modeling off-resonant spinlock and chemical exchange saturation transfer. NMR in biomedicine 2013; 26(5):507-518; and Jin T, Autio J, Obata T, Kim S G. Spinlocking versus chemical exchange saturation transfer MRI for investigating the chemical exchange process between water and labile metabolite protons. Magn Reson Med 2011; 65(5): 1448-1460). For the $i^{th}$ slice, the first signal readout (na=1) is given by $$I_{sat}^{app}(i, ns, na = 1) \approx \quad (2.3)$$
$$\left\{ (\cos\alpha \cdot e^{-R_{1w}\cdot Td} + 1 - e^{-R_{1w}\cdot Td})e^{-R_{1\rho}\cdot[Ts1+Ts2*(i-1)]} + \frac{R_{1w}\cos^2\theta}{R_{1\rho}}\left(1 - e^{-R_{1\rho}\cdot[Ts1+Ts2*(i-1)]}\right) \right\}.$$

$R_{1\rho}$ is the spinlock relaxation rate, being $R_{1\rho}=R_{1w}\cos^2\theta+R_{2w}\sin^2\theta+\sum_{i=1}^{N}R_{ex}^i$, in which $R_{2w}$ is the transverse relaxation rate and $R_{ex}^i$ is the $i^{th}$ CEST effect. For the second signal average and beyond, the signal can be described by $$I_{sat}^{app}(i, ns, na > 1) \approx \quad (2.4)$$
$$\left\{ I_{sat}^{app}(i, ns, na-1) \cdot \frac{\cos\alpha}{\sin\alpha} \cdot e^{-R_{1\rho}\cdot[ns\cdot Ts2]} + \frac{R_{1w}\cos^2\theta}{R_{1\rho}}\left(1 - e^{-R_{1\rho}\cdot[ns\cdot Ts2]}\right) \right\} \cdot \sin\alpha$$

Hence, the apparent Z-spectrum is described $$Z^{app}(i, ns, na) = \frac{I_{sat}^{app}(1, ns, na=1) + \sum_{na=2}^{NA} I_{sat}^{app}(i, ns, na)}{I_0^{app}(1, ns, na=1) + \sum_{na=2}^{NA} I_0^{app}(i, ns, na)} \quad (2.5)$$

The spinlock relaxation rate ($R_{1\rho}$) is solved from Eq. 2.5 ($R_{1\rho}^{QUASS}$), from which the QUASS effect is calculated as $$Z^{QUASS} = \frac{R_1 \cdot \cos^2\theta}{R_{1\rho}^{QUASS}} \quad (2.6)$$

Methods

Simulation

We simulated a representative 3-pool CEST effect with Bloch-McConnell equations (Woessner D E, Zhang S, Merritt M E, Sherry A D. Numerical solution of the Bloch equations provides insights into the optimum design of PARACEST agents for MRI. Magn Reson Med 2005; 53(4): 790-799) in MATLAB (MathWorks, Natick MA). The CEST MRI sequence includes a long primary RF saturation (Ts1), followed by a secondary RF saturation of moderate duration (Ts2) between multislice GE EPI readout and signal averaging, as shown in FIG. 18 (Sun P Z, Cheung J S, Wang E, Benner T, Sorensen A G. Fast multislice pH-weighted chemical exchange saturation transfer (CEST) MRI with Unevenly segmented RF irradiation. Magn Reson Med 2011; 65(2):588-594). We assumed representative $T_1$ of 1.6 s, 1 s, and 1 s for bulk water, amide proton, and semisolid macromolecules, with their $T_2$ being 65 ms, 15 ms, and 10 μs, respectively. The exchange rates were assumed to be 100 s$^{-1}$ for amide protons and 23 s$^{-1}$ for the semisolid MT pool at 0 ppm, with their fraction ratio being 0.125% and 13.9%, respectively. We simulated the in vivo protocol of 5 slices and 4 averages ($B_1$=0.75 μT at 4.7 Tesla) under two conditions: 1) Td/Ts1/Ts2=5/5/0.5 s (same as in vivo scans); 2) Td/Ts1/Ts2=10/10/10 s (serving as the equilibrium reference). The $B_1$ amplitude was chosen because the amide exchange rate is relatively slow, and the APT contrast peaks under such conditions.

Tumor Model and MRI

The local Institutional Animal Care and Use Committees approved the study. Briefly, $2\times10^5$ cells of the non-infiltrating D74-rat glioma model were injected into the right frontal lobe of 12 adult male Fischer 344 rats. The animals were imaged 11-13 days after tumor implantation. MRI scans were performed on a 4.7 Tesla scanner (Bruker Biospec, Ettlingen, Germany). Multi-slice single-shot EPI readout was implemented (FOV=25×25 mm$^2$, matrix=64×64, slice thickness/gap=1.8/0.2 mm, 5 slices). We obtained Z-spectrum from −6 ppm to 6 ppm with intervals of 0.25 ppm ($B_1$=0.75 µT). The relaxation delay (Td), primary saturation time (Ts1), secondary saturation time (Ts2), and echo time were 5 s, 5 s, 0.5 s, and 15 ms, respectively, with four signal averages (scan time=16 min 40 s). $T_1$-weighted images were acquired with seven inversion delays from 250 to 3,000 ms (repetition time (TR)/TE=6,500/15 ms, NSA=4, scan time=3 min); $T_2$-weighted images were obtained with two TE of 30 and 100 ms (TR=3,250 ms, 16 averages, scan time=1 min 44 s). In addition, diffusion MRI was obtained with two b values of 250 and 1000 s/mm$^2$, TR/TE=3250/42 ms, 16 averages, scan time=1 min 44 s)

Data Analysis

Parametric $T_1$, $T_2$, and apparent diffusion coefficient (ADC) maps were obtained using least-squares mono-exponential fitting of the signal intensities as functions of the inversion time, echo time, and diffusion b values. The Z spectrum was normalized by the unsaturated scan ($I_0$) as $$Z = \frac{I(\Delta\omega)}{I_0}.$$

The $B_0$ inhomogeneity was determined from the frequency offsets of the Z-spectrum (Kim M, Gillen J, Landman B A, Zhou J, van Zijl P C. Water saturation shift referencing (WASSR) for chemical exchange saturation transfer (CEST) experiments. Magn Reson Med 2009; 61(6): 1441-1450). The tumor lesion was manually outlined in APTw ($MTR_{asym}$) image and automatically mirrored along the midline to the contralateral brain, excluding the ventricle, as the reference region of interest (ROI). We applied the multi-pool spinlock model-based fitting to resolve the Z-spectrum as, $$Z^{app/QUASS} = \frac{R_1\cos^2\theta}{R_1\cos^2\theta + R_2\sin^2\theta + \sum_{i=1}^{N}\frac{A_i}{\left(1+4\left(\frac{\Delta\omega-\delta_i}{\sigma_i}\right)^2\right)}} \quad (2.7)$$

Eq. 2.7 resolves the Z-spectra in terms of the peak ($A_i$), chemical shift ($\delta_i$) and full width half maximum (FWHM, $\sigma_i$) of each labile proton group. The upper and lower boundaries are from 0 to 150% of the initial guesses for the amplitudes, ±25% for the FWHM, with the range for the chemical shifts being ±0.25 ppm from the initial values. We used a two-tailed paired t-test with Holm-Bonferroni correction, and the results were regarded as statistically significant for P values under 0.05.

Results

Figure 14A:
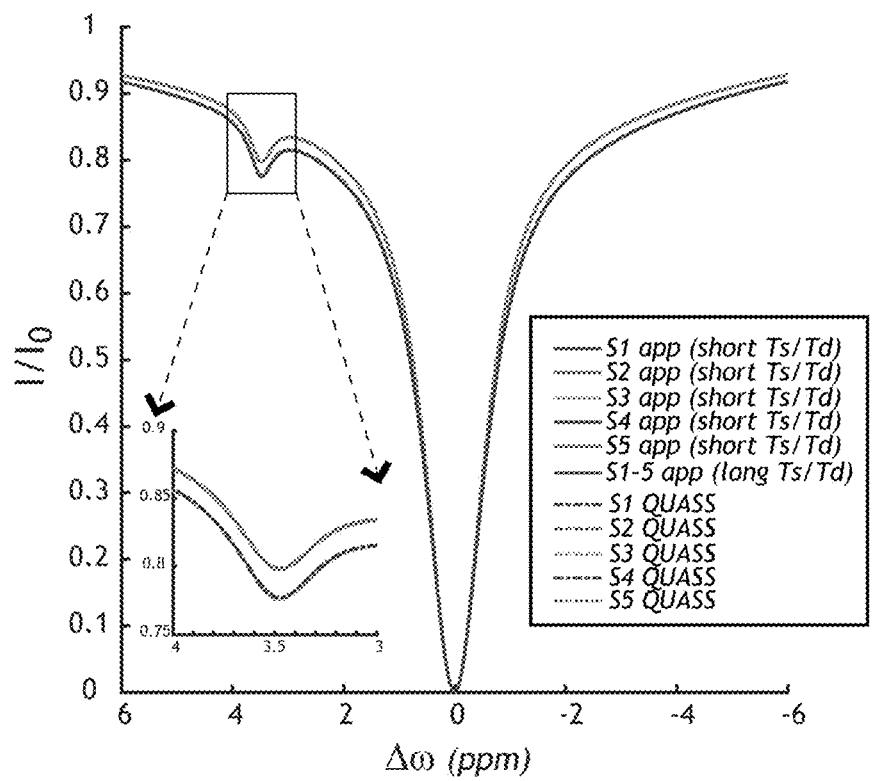
FIGS. 14A and B show the simulation of the QUASS algorithm for the modified fast multislice CEST MRI with gradient EPI sequence.
Figure 14B:
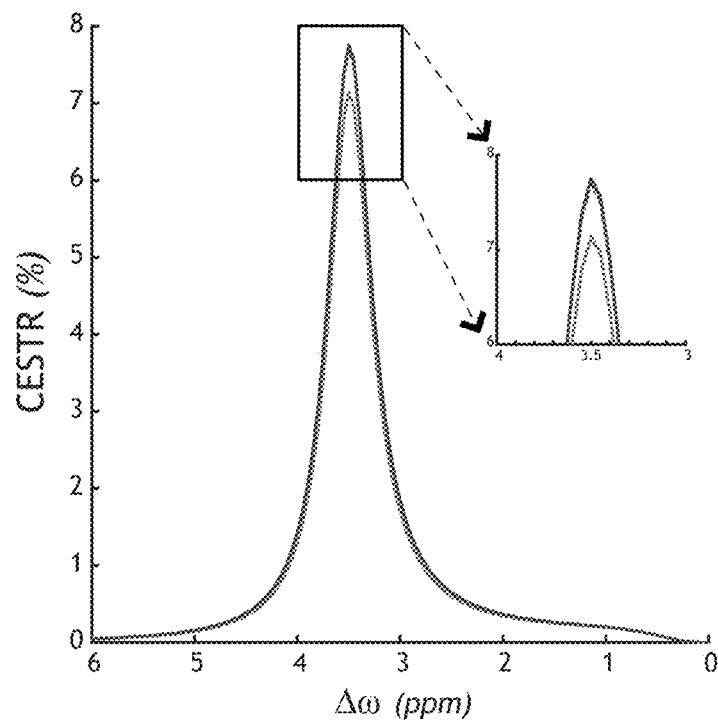
FIG. 14B shows the apparent CEST asymmetry spectra underestimated the CEST effect. The reconstructed QUASS asymmetry and equilibrium asymmetry spectra (long Td, Ts1, and Ts2) overlapped.

The QUASS algorithm was assessed with a simulated multislice CEST MRI sequence with a representative FA of 60° and 4 averages. Because of the relatively long relaxation delay and a moderate FA, the apparent Z-spectra overlapped well (FIG. 14A). The Z-spectrum under long Ts and Td was shown in solid red, which was more attenuated from the apparent Z-spectra. This difference is because the equilibrium state experiences more saturation transfer than under the condition of a moderate CEST saturation duration. The QUASS Z-spectra were shown in dashed lines, overlapping the equilibrium Z-spectral simulation. FIG. 14B shows the corresponding asymmetry Z-spectra, revealing that the QUASS CEST effects overlap the equilibrium asymmetry spectrum, higher over the apparent asymmetry Z-spectra.

Figure 19A:
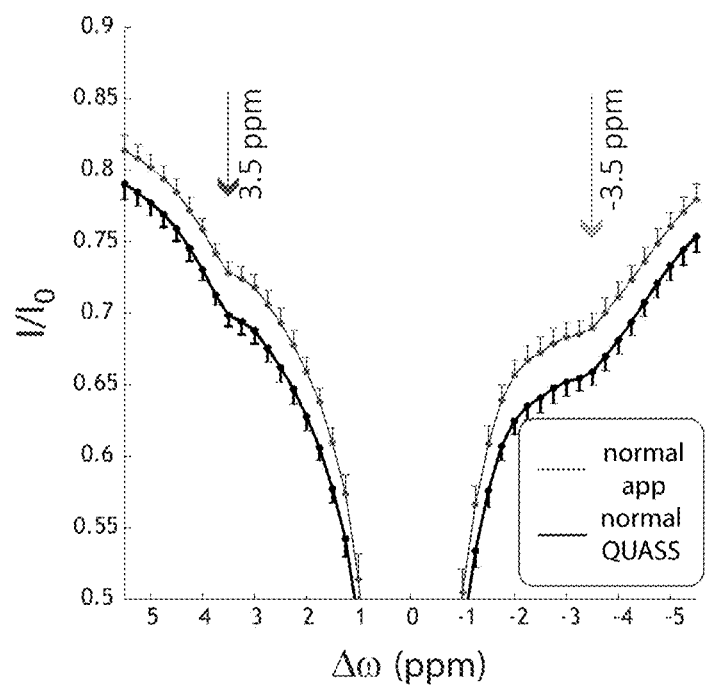
FIGS. 19A and B show a comparison of apparent and QUASS Z-spectra from the normal and tumor tissues.
Figure 19B:
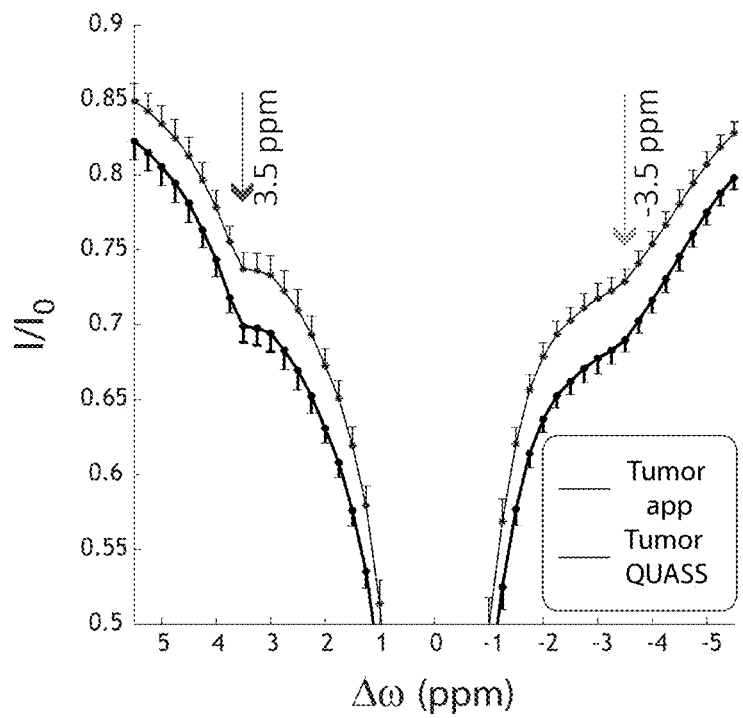
FIG. 19B shows the apparent and QUASS Z-spectra from the tumor ROI.

FIGS. 15A-E show multiparametric images of a representative brain tumor rat. The $T_1$ map (FIG. 15A) showed a $T_1$ increase in the tumor from the contralateral normal area (1.5±0.1 vs. 1.8±0.1 s, P<0.01). The $T_2$ map (FIG. 15B) showed a small and non-significant decrease from 58±2 to 54±3 ms. FIG. 15C shows the $T_1$ over $T_2$ map, with a significant increase in the tumor, from 25±2 to 34±2 (P<0.01). The ADC increased in the tumor, from 0.81±0.03 to 0.91±0.05 µm$^2$/ms (FIG. 15D). While the apparent $MTR_{asym}$ increased from −3.8±0.8% (normal tissue) to −0.9±0.6% (tumor), QUASS $MTR_{asym}$ increased from −4.0±0.8% to −0.9±0.7%. Although the difference is small, it was statistically significant. The change between tumor and normal tissue in $MTR_{asym}$ was 2.8±0.6% and 2.9±0.6% (P<0.001) for the apparent and QUASS CEST MRI. FIGS. 19A and B compare acquired and QUASS Z-spectra, showing further QUASS Z-spectral attenuation in the normal (FIG. 19A) and tumor tissue (FIG. 19B) from the acquired Z spectra.

Figure 16A:
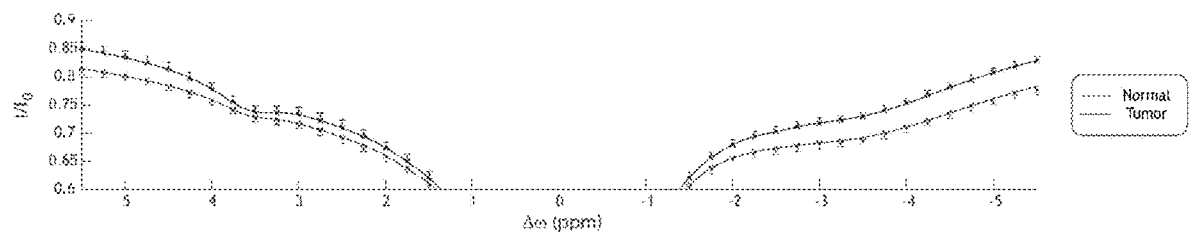
FIGS. 16A-C show spinlock model-based multi-pool fitting of the apparent Z-spectra.
Figure 16B:
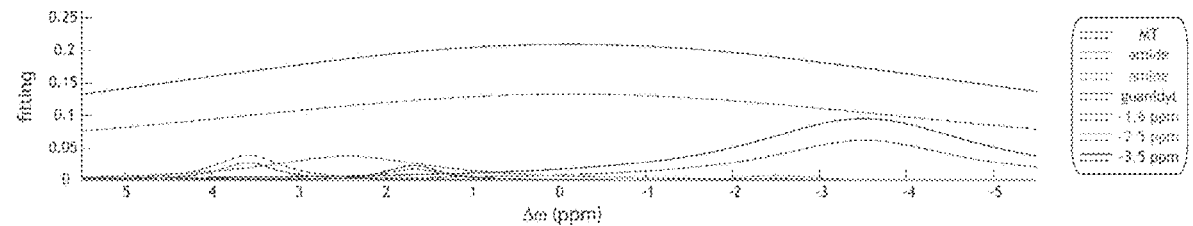
Figure 16C:
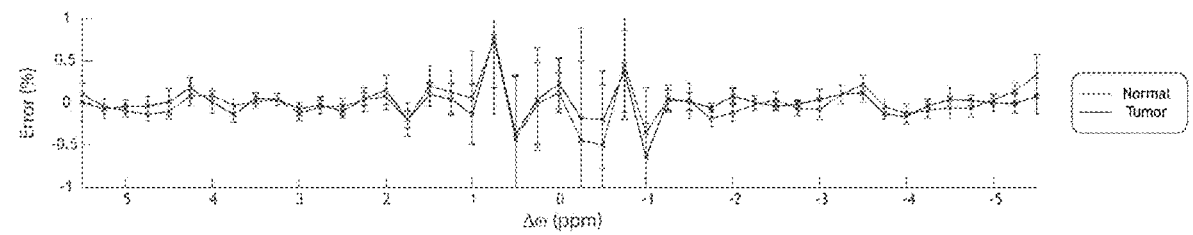
Figure 17A:
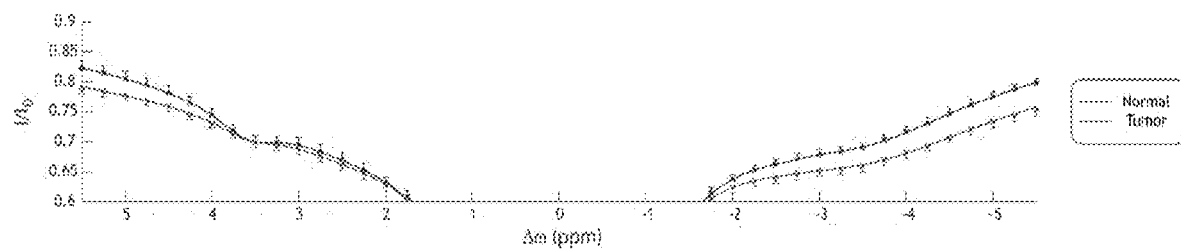
FIGS. 17A-C show spinlock model-based multi-pool fitting of the QUASS Z-spectra.
Figure 17B:
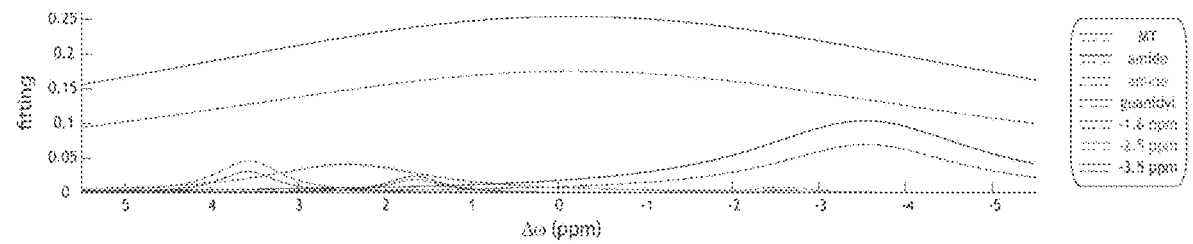
Figure 17C:
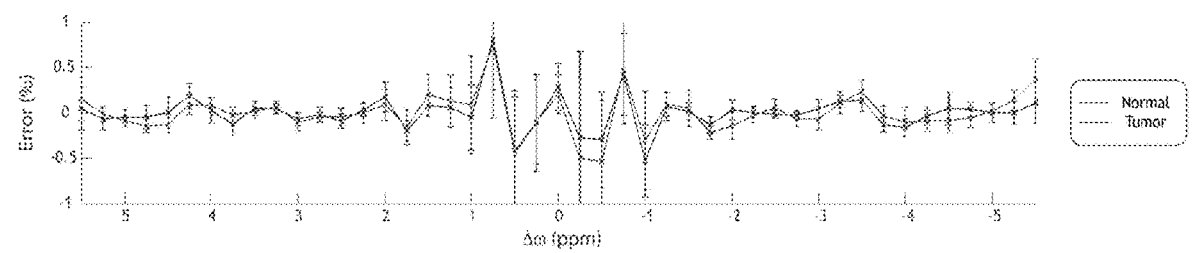

To resolve the multi-pool contributions, we modeled the CEST Z-spectra with a 7-pool spinlock model (FIG. 20). The peak amplitudes are provided in the table shown in FIG. 20. The mean and standard deviation of spinlock model-based fitting of the apparent and QUASS Z-spectra are shown in FIGS. 16A and 17A, with isolated peaks (FIGS. 16B and 17B) and the differences between fitting and data (FIGS. 16C and 17C). The root-mean-square deviation (RMSD) was no more than 0.3% for spinlock model-based fittings (apparent and QUASS for both normal and tumor regions), suggesting satisfactory accuracy (FIGS. 16A-C and 17A-C). As expected, the QUASS analysis showed that the MT, amide, and NOE effects were significantly less for this protocol than observed at the reconstructed equilibrium state. Briefly, the amplitude of the MT pool from the apparent CEST solution was (20.6±2.3% (normal) vs. 13.2±2.0%/s (tumor), P<0.05), and they were 25.0±2.1% and 17.3±2.2% (P<0.05) with QUASS analysis. In addition, the apparent amide peaks increased from 3.2±0.4%/s to 4.4±0.5% (P<0.05) in the tumor, with the corresponding QUASS amide peaks being 3.6±0.5% and 5.1±0.6% (P<0.05), respectively. Also, while the apparent NOE decreased from 9.4±1.5% to 6.1±0.8% (P<0.05) in the tumor, the QUASS NOE signal decreased from 10.2±1.6% to 6.8±1.0% (P<0.05). In addition, although there was no statistical difference between apparent and QUASS guanidyl signals, the tumor had a significant drop in apparent guanidyl signal from 1.5±0.9% to 0.7±0.8% from the contralateral normal area, with the corresponding QUASS signal dropped from 1.9±0.8% to 0.9±0.8%. Cai et al. attributed CEST @ 2 ppm signal to creatine (Cai K, Singh A, Poptani H, Li W, Yang S, Lu Y, Hariharan H, Zhou X J, Reddy R. CEST signal at 2 ppm (CEST@2 ppm) from Z-spectral fitting correlates with creatine distribution in brain tumor. NMR Biomed 2015; 28(1):1-8). To estimate the origin of the APTw contrast, we used the spinlock formula $$MTR_{asym}(3.5\text{ ppm}) = \frac{R_1\cos^2\theta}{R_1\cos^2\theta + R_2\sin^2\theta + \sum_{i=1}^{N}R_{ex}(-3.5\text{ ppm})} -$$

$$\frac{R_1\cos^2\theta}{R_1\cos^2\theta + R_2\sin^2\theta + \sum_{i=1}^{N}R_{ex}(+3.5\text{ ppm})}.$$

For $B_1$ amplitude of 0.75 µT (both simulation and in vivo experiments), we have $\cos^2\theta = 0.998$. Hence, we have $$MTR_{asym}(3.5\text{ ppm}) =$$

$$\frac{R_1\left(\sum_{i=1}^{N}R_{ex}(+3.5\text{ ppm}) - \sum_{i=1}^{N}R_{ex}(-35\text{ ppm})\right)}{\left(R_1 + \sum_{i=1}^{N}R_{ex}(-3.5\text{ ppm})\right)\left(R_1 + \sum_{i=1}^{N}R_{ex}(+3.5\text{ ppm})\right)}.$$

Also, due to its relatively narrow bandwidth with respect to the amide-guanidyl chemical shift difference, there is a negligible guanidyl effect at 3.5 ppm. In addition, the amine signal did not show much difference between the tumor and normal tissue. Hence, we replaced the normal tissue $T_1$, MT, APT, and NOE variables with those determined from tumor ROI, one at a time. We determined $MTR_{asym}$ contrast between the tumor and normal tissue, being −0.4%, −0.5%, 1.1%, and 2.4%, respectively. $MTR_{asym}$ increased by 3.5%, with replacements of all four parameters simultaneously. This finding indicated that excluding the mild interaction terms, the observed $MTR_{asym}$ contrast between normal and tumor tissues is primarily due to synergistic APT increase and NOE decrease, with a relative contribution of about ⅓ and ⅔, respectively.

Discussion

Our study extended the QUASS algorithm to a CEST sequence with two-tiered RF saturation and gradient echo readout, reconstructing Z-spectra as if long saturation time and relaxation delay conditions were used. Capitalizing on the reconstructed equilibrium Z-spectrum, the spinlock model-based multi-pool fitting approach documents significantly different MT, amide, and NOE signal changes from the apparent Z-spectra.

For the spinlock model-based fitting, we used experimentally measured $T_1$ so the $T_1$ relaxation change can be directly accounted for. In addition, normal and tumor ROI fitting shared the same chemical shifts to reduce the number of free parameters. It helps to discuss the contribution of multiple components in tumor APTw contrast. Although the MT effect dropped significantly in the tumor, the difference between ±3.5 ppm (semisolid MT asymmetry) changed marginally and similarly between tumor and normal tissue, about −1%. The MT decrease is likely due to loss of myelin or increased water content in the tumor, consistent with the observed $T_1$ increase. In addition, the tumor $T_1$ and isolated APT signal increased from the contralateral normal tissue by 24% and 42%, respectively, suggesting that $T_1$ and amide signal increases are likely to have different origins, complementing each other. In edema models and tumor patients, it has been shown that water content correlates with $T_1$. Because the CEST amplitude determined from the spinlock model is the product of labile proton concentration and exchange rate independent of $T_1$, the total amide content would have increased by more than 42%. Indeed, there were notable size differences in abnormalities from the relaxation, diffusion, and CEST MRI (FIGS. 15A-F). The ventricle appears hyperintense on ADC, $T_1$, and $T_2$ images but not on the $MTR_{asym}$ map. In addition, while the $T_1$ over $T_2$ ratiometric map, a term in the spinlock formula, showed hyperintensity only in the central tumor region, it is smaller than the $MTR_{asym}$ abnormality. Conversely, ADC showed areas of diffuse hyperintensity well beyond the $MTR_{asym}$ abnormality. Admittedly, our study only investigated a single non-infiltrating tumor cell line, and the observed mismatches in multiparametric MRI should be further explored. In addition, the amine CEST effect showed little difference between normal and tumor tissues (well under 0.1%). This indicates that although a moderate RF amplitude is adequate for measuring APT and NOE effects, it is not tuned for detecting fast amine exchange. Also, the bandwidth of guanidyl is moderate, so the drop in CEST@2 ppm does not meaningfully impact 3.5 ppm.

It helps to mention that the QUASS algorithm reconstructs the desired equilibrium state without requiring an exceedingly long time to obtain it experimentally. For example, if we assume Td, Ts1, and Ts2 are 7.5 s (five times a typical $T_1$ of 1.5 s), the total scan time for the multi-slice CEST scan would have been over 2 hr. The current theory derived the initial state without considering the relatively small CEST effects due to the use of moderate recovery and saturation times. The simulation showed excellent agreement, suggesting residual effects from prior offsets are likely negligible. The high-order correction will probably be needed when extremely short Td and Ts are used, presumably requiring an iterated solution to account for the carry-forward effect. A prior work simulated Ts of 1 s for a representative $T_1$ of 2.5 s (Ts being 40% of $T_1$). The apparent and QUASS CEST effects were underestimated by −47% and −7% from the desired equilibrium state, demonstrating the advantage of the QUASS solution (Sun P Z. Quasi-steady state chemical exchange saturation transfer (QUASS CEST) analysis-correction of the finite relaxation delay and saturation time for robust CEST measurement. Magn Reson Med 2021; 85(6):3281-3289). It has been shown that high CEST SNR efficiency is achieved when using reasonable delay and saturation times, and under such conditions, QUASS reconstructs the desired equilibrium state at a good sensitivity efficiency. Still, it could be interesting to push for the shortest possible Ts and Td with the QUASS solution to expedite the scans. The NOE effect closest to the bulk water was at by −1.4±0.1 ppm (acquired CEST) and by −1.4±0.2 ppm (QUASS CEST), respectively, differing slightly from by −1.6 ppm observed at high field. Considering a typical standard deviation of 0.1-0.2 ppm, these signals should represent the same origin, and therefore, it was labeled as by −1.6 ppm, presumably more accurately determined from the high field. Our study generalized QUASS CEST for the GE readout, which can be further adapted for reconstructing emerging 3D CEST imaging schemes. It is helpful to note that the spinlock model is preferred over model-free Lorentzian fitting because it better accounts for confounding relaxation changes. Our study collected Z-spectrum using a single RF amplitude, which only provides quantification of the amplitude, FWHM, and chemical shift.

Conclusion

Our study extended the QUASS algorithm to a fast multislice CEST MRI sequence with two-tiered RF saturation and gradient echo readout to reconstruct the desired equilibrium CEST results from experimental data, a step towards sequence-independent CEST quantification. The multi-pool spinlock model-based fitting revealed significant MT, amide, and NOE signal differences between the apparent and reconstructed QUASS CEST MRI. Furthermore, the $MTR_{asym}$ contrast between tumor and normal tissues was attributed to synergistic APT increase and NOE decrease.

The disclosures of each and every publication cited herein are hereby incorporated herein by reference in their entirety.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed:

1. A method for determining a chemical exchange saturation transfer (CEST) equilibrium effect, comprising:
    acquiring based on one or more parameters, radiofrequency (RF) offset, and the pulse sequence for one or more rounds: (i) two or more control slice readouts of magnetic resonance imaging (MRI) CEST imaging based on parameters and pulse sequence, ii) two or more saturated slice readouts of the MRI CEST imaging based on one or more parameters, RF offset, and the pulse sequence, iii) one or more signal averages for each slice readout and offset, the one or more signal averages including a first signal average for each slice readout and offset, and iv) normalized spectrum for each RF offset, the one or more parameters including relaxation delay;
    the two or more control slice readouts including a first control slice readout and one or more additional control slice readouts; and
    the two or more saturated slice readouts including a first saturated slice readout and one or more additional saturated slice readouts;
    determining a saturation time for each saturated slice readout for each signal average;
    determining a control relaxation time for each control slice readout using the respective saturation time and the relaxation delay for each signal average;
    determining a saturated relaxation time for each saturated slice readout using the relaxation delay for each signal average;
    determining a spinlock relaxation rate for each RF offset for at least the first signal average, using the one or more parameters, each saturated time for each saturated slice readout, each control relaxation time for each control slice readout, and each saturated relaxation time for each saturated slice readout for the first signal average, so that the normalized spectrum for each RF offset and each slice first signal average corresponds to at least each transient state associated with each saturated slice readout normalized by at least each control state associated with each control slice readout based on the spinlock relaxation rate;
    reconstructing CEST equilibrium effect for each RF offset using the respective spinlock relaxation rate for the RF offset; and
    determining one or more quantitative information using the CEST equilibrium effect.

2. The method of claim 1, wherein each transient state includes an equilibrium signal.

3. The method of claim 1,
    wherein the one or more signal averages, including one or more additional signal averages for each slice readout and offset; and
    wherein the acquiring includes acquiring one or more preparation modules and readout time associated with each signal average;
    the method further comprising:
        determining a second saturation time for each saturated slice readout for each additional signal average;
        determining a second control relaxation time for each control slice readout using the respective saturation time for each additional signal average; and
        determining a second saturated relaxation time for each saturated slice readout using the preparation module and the readout time for each additional signal average;
    wherein the determining the spinlock relaxation rate for each RF offset further uses the second saturated time for each saturated slice readout of each additional signal average, the second control relaxation time for each control slice readout of each additional signal average, the second saturated relaxation time for each saturated slice readout of each additional signal average, so that the normalized spectrum for each RF offset corresponds to the sum of at least the first transient state associated with the first saturated readout and a second transient state associated with the one or additional saturated readouts normalized by the sum of at least the first control state associated with the first control readout and a second transient state associated with the one or additional control readouts.

4. The method of claim 1, wherein the sequence is a multi-slice gradient echo sequence and the one or more parameters includes RF flip angle.

5. The method of claim 1, wherein the readouts are for at least one offset.

6. The method of claim 1, further comprising:
    determining one or more quantitative information based on the CEST equilibrium signal.

7. The method of claim 6, further comprising:
    reporting the quantification method.

8. The method of claim 1, wherein the sequence is a multi-slice spin echo sequence.

9. A system for determining a chemical exchange saturation transfer (CEST) equilibrium effect, comprising:
    at least one computing device comprising a processor and a memory; and
    machine-readable instructions stored in the memory that, when executed by the processor, cause the computing device to at least:
        acquire based on one or more parameters, radiofrequency (RF) offset, and the pulse sequence for one or more rounds: (i) two or more control slice readouts of magnetic resonance imaging (MRI) CEST imaging based on parameters and pulse sequence, ii) two or more saturated slice readouts of the MRI CEST imaging based on one or more parameters, RF offset, and the pulse sequence, iii) one or more signal averages for each slice readout and offset, the one or more signal averages including a first signal average for each slice readout and offset, and iv) normalized spectrum for each RF offset, the one or more parameters including relaxation delay;
        the two or more control slice readouts including a first control slice readout and one or more additional control slice readouts; and the two or more saturated slice readouts including a first saturated slice readout and one or more additional saturated slice readouts;

determine a saturation time for each saturated slice readout for each signal average;

determine a control relaxation time for each control slice readout using the respective saturation time and the relaxation delay for each signal average;

determine a saturated relaxation time for each saturated slice readout using the relaxation delay for each signal average;

determine a spinlock relaxation rate for each RF offset for at least the first signal average, using the one or more parameters, each saturated time for each saturated slice readout, each control relaxation time for each control slice readout, and each saturated relaxation time for each saturated slice readout for the first signal average, so that the normalized spectrum for each RF offset and each slice first signal average corresponds to at least each transient state associated with each saturated slice readout normalized by at least each control state associated with each control slice readout based on the spinlock relaxation rate;

reconstruct CEST equilibrium effect for each RF offset using the respective spinlock relaxation rate for the RF offset; and determine one or more quantitative information using the CEST equilibrium effect.

10. The system of claim 9, wherein each transient state includes an equilibrium signal.

11. The system of claim 9, wherein the one or more signal averages, including one or more additional signal averages for each slice readout and offset;

wherein the acquiring includes acquiring one or more preparation modules and readout time associated with each signal average; and wherein the machine-readable instructions, when executed, further cause the at least one computing device to at least:

determine a second saturation time for each saturated slice readout for each additional signal average;

determine a second control relaxation time for each control slice readout using the respective saturation time for each additional signal average; and determine a second saturated relaxation time for each saturated slice readout using the preparation module and the readout time for each additional signal average;

wherein the determination of the spinlock relaxation rate for each RF offset further uses the second saturated time for each saturated slice readout of each additional signal average, the second control relaxation time for each control slice readout of each additional signal average, the second saturated relaxation time for each saturated slice readout of each additional signal average, so that the normalized spectrum for each RF offset corresponds to the sum of at least the first transient state associated with the first saturated readout and a second transient state associated with the one or additional saturated readouts normalized by the sum of at least the first control state associated with the first control readout and a second transient state associated with the one or additional control readouts.

12. The system of claim 9, wherein the sequence is a multi-slice gradient echo sequence and the one or more parameters includes RF flip angle.

13. The system of claim 9, wherein the readouts are for at least one offset.

14. The system of claim 9, wherein the machine-readable instructions, when executed, further cause the at least one computing device to at least:

determine one or more quantitative information based on the CEST equilibrium signal.

15. The system of claim 14, wherein the machine-readable instructions, when executed, further cause the at least one computing device to at least:

report the quantification method.

16. The system of claim 9, wherein the sequence is a multi-slice spin echo sequence.

* * * * *